United States Patent
McClary et al.

(10) Patent No.: US 7,243,253 B1
(45) Date of Patent: Jul. 10, 2007

(54) REPEATING SWITCHING OF A CROSS-CONNECT AND A TIMING SOURCE IN A NETWORK ELEMENT THROUGH THE USE OF A PHASE ADJUSTER

(75) Inventors: Michael McClary, Newark, CA (US); Sharath Narahari, Pleasanton, CA (US)

(73) Assignee: Redback Networks Inc., San Jose, CA (US)

( * ) Notice: Subject to any disclaimer, the term of this patent is extended or adjusted under 35 U.S.C. 154(b) by 0 days.

(21) Appl. No.: 10/602,461

(22) Filed: Jun. 23, 2003

Related U.S. Application Data

(60) Provisional application No. 60/390,630, filed on Jun. 21, 2002.

(51) Int. Cl.
*G06F 1/12* (2006.01)

(52) U.S. Cl. ............... 713/500; 713/400; 713/401; 713/503; 713/600; 345/537; 345/538; 345/545; 345/558; 710/53; 710/56; 710/310; 370/503; 370/506; 370/516

(58) Field of Classification Search .......... 713/500, 713/501, 503, 600
See application file for complete search history.

(56) References Cited

U.S. PATENT DOCUMENTS

| | | | | |
|---|---|---|---|---|
| 5,331,639 | A * | 7/1994 | Takatori et al. | 370/506 |
| 5,434,892 | A * | 7/1995 | Dike et al. | 375/377 |
| 6,272,552 | B1 * | 8/2001 | Melvin et al. | 709/250 |
| 6,275,896 | B1 * | 8/2001 | Kojima | 711/112 |
| 6,456,702 | B2 * | 9/2002 | Nishihara | 379/93.05 |
| 6,581,164 | B1 * | 6/2003 | Felts et al. | 713/400 |
| 6,647,502 | B1 * | 11/2003 | Ohmori | 713/322 |
| 6,751,238 | B1 * | 6/2004 | Lipp et al. | 370/541 |
| 6,982,993 | B1 * | 1/2006 | Claveloux et al. | 370/503 |

* cited by examiner

*Primary Examiner*—Rehana Perveen
*Assistant Examiner*—Nitin C. Patel
(74) *Attorney, Agent, or Firm*—Blakely, Sokoloff, Taylor & Zafman LLP

(57) ABSTRACT

A method and apparatus for enabling repeated switching of a cross-connect and a timing source in a network element through the use of a phase adjuster. In one embodiment, a traffic card includes an aligner to adjust the occupancy of the data in two ingress FIFOs to synchronize their occupancy. In addition, the traffic card includes a clock control logic, including a phase adjuster, to adjust the phase of clock signals driving the two ingress FIFOs to avoid an underflow or overflow.

16 Claims, 15 Drawing Sheets

REPEATING SWITCHING OF A CROSS-CONNECT AND A TIMING SOURCE IN A NETWORK ELEMENT THROUGH THE USE OF A PHASE ADJUSTER

CROSS-REFERENCE TO RELATED APPLICATIONS

This claims the benefit of U.S. Provisional Application No. 60/390,630, filed Jun. 21, 2002.

This is related to U.S. application Ser. No. 10/602,481, filed Jun. 23, 2003.

FIELD OF THE INVENTION

The invention relates to the field of communications. More specifically, the invention relates to switching of a cross-connect and a timing source in a network element.

BACKGROUND OF THE INVENTION

In the field of communications, the need for high-speed transmission of data including video and audio has continued to increase. Moreover, the need for reliability of network elements within these networks that allow for this type of data transmission is becoming increasingly important.

Such network elements include various configurations of traffic cards, control cards, clock source cards, cross-connect cards, etc. In certain network elements, functionalities of these different cards can be combined. For example, a control card can also include the clock source and cross-connect functionalities. In other network element configurations, the cross-connect and control card functionalities are combined into the same card, while the clock source functionality is segregated into a separate card.

Further, these network elements can include redundancy for the traffic cards, control cards, clock source cards, cross-connect cards, etc., wherein a given type of card can include both a primary and a secondary card. Accordingly, when a primary card is not functioning correctly, the secondary card becomes the active card and serves as the new primary card for the given functionality.

Disadvantageously, conventional approaches that allow for the switch from the primary to the secondary can result in a loss of data as well as a disruption to framing and clocking of such data. For example, assume that the configuration of a network element is such that the control card includes the clock source as well as the cross-connect functionality for a number of traffic cards. If the network element switches from the primary to the secondary card for this control card because the primary is not operating correctly, then (depending on when the switch occurred) data, framing and/or clocking can be lost within the cards of the network element.

SUMMARY OF THE INVENTION

A method and apparatus for enabling repeated switching of a cross-connect and a timing source in a network element through the use of a phase adjuster are described. In one embodiment, a traffic card includes an aligner to adjust the occupancy of the data in two ingress FIFOs to synchronize their occupancy. In addition, the traffic card includes a clock control logic, including a phase adjuster, to adjust the phase of clock signals driving the two ingress FIFOs to avoid an underflow or overflow.

DETAILED DESCRIPTION

Figure 1:
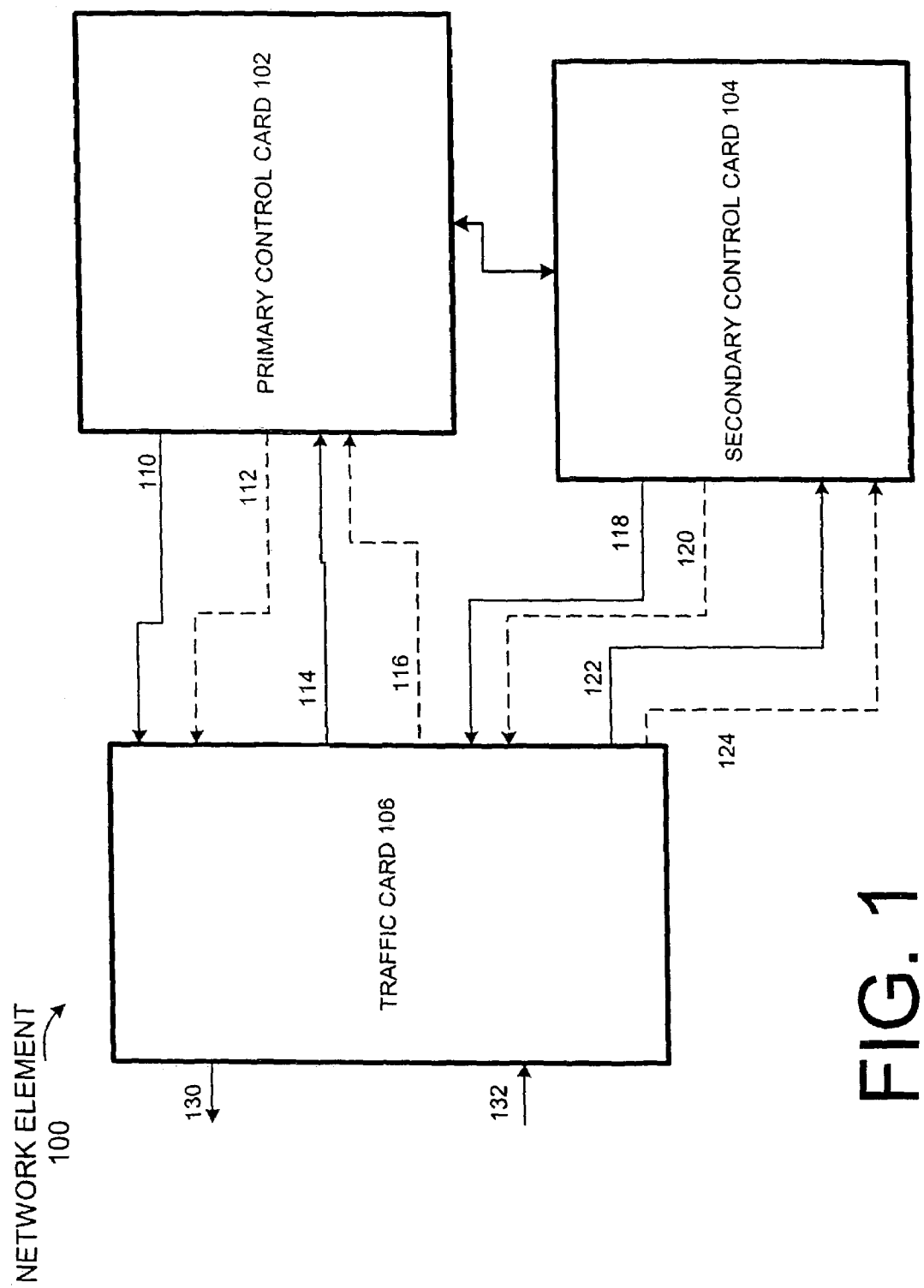
FIG. 1 illustrates a block diagram of a portion of a network element, according to one embodiment of the invention.

A method and apparatus for enabling cross-connect switching in a network element are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

A number of figures show block diagrams of systems for enabling cross-connect switching in a network element and performing a phase adjustment for a clocking source related to the cross-connect switching, in accordance with embodiments of the invention, while other figures show flow diagram illustrating operations for enabling cross-connect switching in a network element and performing a phase adjustment for a clocking source related to the cross-connect switching, according to embodiments of the invention. The operations of the flow diagrams will be described with references to the systems shown in the block diagrams. However, it should be understood that the operations of the flow diagram could be performed by embodiments of systems other than those discussed with reference to the block diagrams, and embodiments discussed with reference to the systems could perform operations different than those discussed with reference to the flow diagram.

FIG. 1 illustrates a block diagram of a portion of a network element, according to one embodiment of the invention. In particular, FIG. 1 illustrates a network element 100 that includes a primary control card 102, a secondary control card 104 and a traffic card 106. While the network element 100 illustrated in FIG. 1 includes one traffic card 106, the embodiments of the invention are not so limited, as there can be a greater number of such cards within the network element 100 that are coupled to the primary control card 102 and the secondary control card 104 (as shown).

The traffic card 106 is coupled to receive data 132 and transmit data 130. In an embodiment, the data 130 and the data 132 are transmitted on transmission lines that can be based on a number of different protocols (such as Synchronous Optical Network (SONET), Internet Protocol (IP), etc.). In one embodiment, such transmission lines are coupled to other network elements and/or other communication devices (not shown).

In one embodiment, the primary control card 102 and the secondary control card 104 comprise a redundant pair of control cards that include cross-connect functionality thereon. In particular, in one embodiment, the primary control card 102 and the secondary control card 104 include a number of routing tables such that data being received into and output from a number of traffic cards 106 are forwarded to these control cards to be routed out from the network element 100 on the appropriate interface of a given traffic card. In an embodiment, such data being routed include a number of STS signals based on the SONET or SDH protocol. However, embodiments of the invention are not so limited, as data based on a number of different protocols can be routed through the control cards 102 and 104.

As shown, the primary control card 102 and the secondary control card 104 are coupled to the traffic card 106. The primary control card 102 is also coupled to the secondary control card 104. The primary control card 102 is coupled to the traffic card 106 such that the primary control card 102 is transmitting primary transmitting data 110 and a primary transmitting clock signal 112 to the traffic card 106. Additionally, the traffic card 106 is coupled to the primary control card 102, wherein the traffic card 106 is transmitting primary receiving data 114 and a primary receiving clock signal 116 to the primary control card 102. The secondary control card 104 is coupled to the traffic card 106 such that the secondary control card 104 is transmitting secondary transmitting data 118 and a secondary transmitting clock signal 120. Moreover, the traffic card 106 is coupled to the secondary control card 104 such that the traffic card 106 is transmitting the secondary receiving data 122 and a secondary receiving clock signal 124 to the secondary control card 104.

In one embodiment, the primary control card 102, the secondary control card 104 and the traffic card 106 includes different clocking domains. In particular, the clocking domain for the primary control card 102 is different from the clocking domain of the secondary control card 104, which is different from the clocking domain for the traffic card 106. In an embodiment, these different clocking domains derive their clocking from a same source. In one embodiment, this clocking source is from the clocking within the data signal being received by the network element 100 (e.g., the clocking from the data 132).

In one embodiment, the primary control card 102 and the secondary control card 104 derive their clocking from a same source, but independent of each other. In another embodiment, the primary control card 102 derives its clocking from a given source and transmits its clocking to the secondary control card 104. In an embodiment, the primary control card 102 and the secondary control card 104 derive their clocking from different sources. While the traffic control card 106 can derive its clocking from a number of different sources, in an embodiment, the traffic control card 106 derives its clocking from the primary control card 102.

As will be described in more detail below, in an embodiment, the traffic card 106 employs two different First-In-First-Out (FIFOs) for receiving the data from the primary control card 102 and the secondary control cards 104. In one embodiment, the secondary control card 104 receives feedback signals indicating a difference in the occupancy of the two different FIFOs and thereby adjusting its clocking to match the clocking for the primary control card 102. For example, the feedback signal could indicate that the FIFO that is receiving data from the primary control card 102 is more full in comparison to the FIFO that is receiving data from the secondary control card 104. Accordingly, the secondary control card 104 could retard its clock rate to match the clock rate for the primary control card 102.

Figure 2:
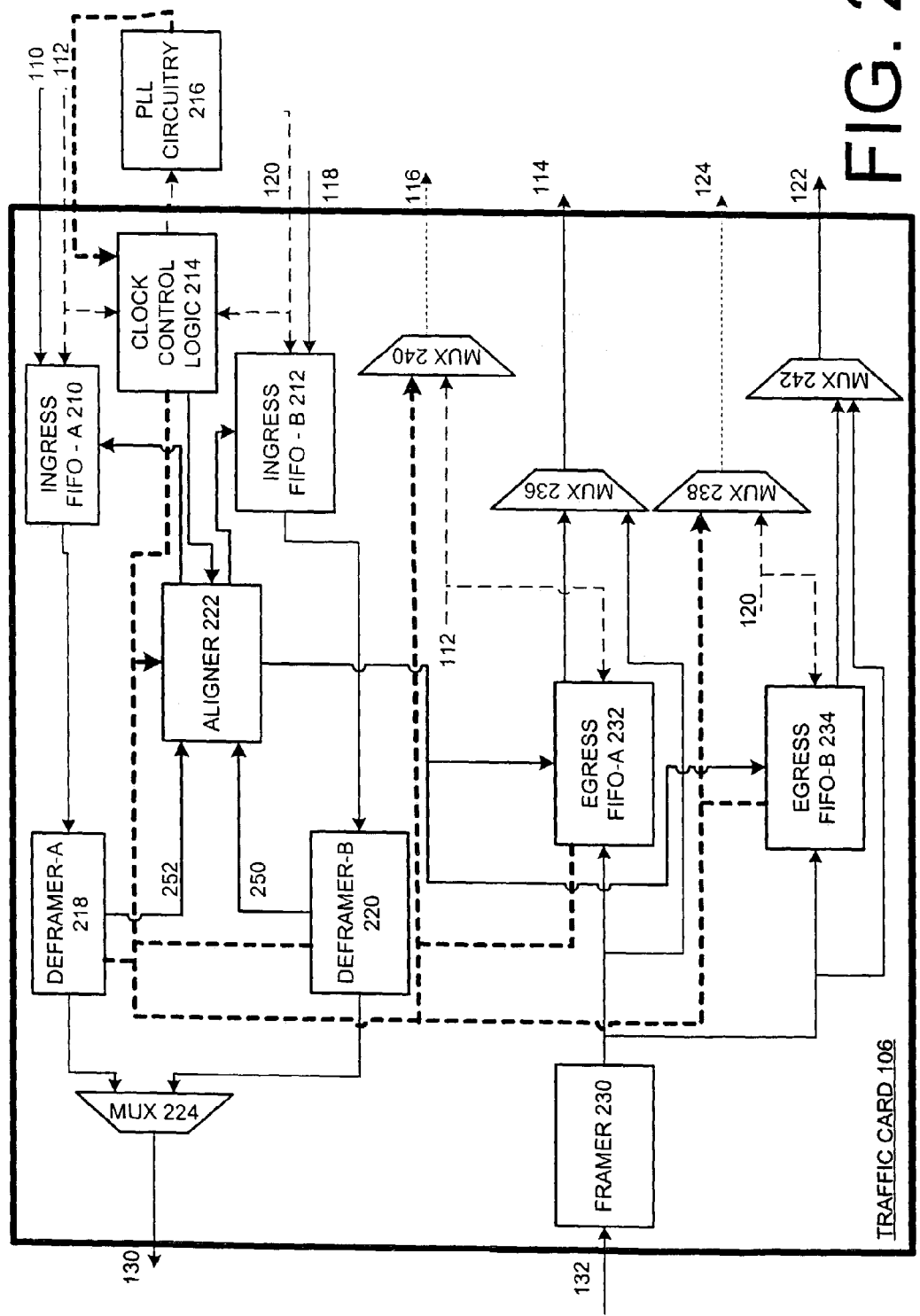
FIG. 2 illustrates a more detailed block diagram of a traffic card, according to one embodiment of the invention.

A more detailed description of the traffic card 106 will now be described. In particular, FIG. 2 illustrates a more detailed block diagram of a traffic card, according to one embodiment of the invention. The traffic card 106 comprises a clock control logic 214, an ingress First In First Out (FIFO)-A 210, a deframer-A 218, an ingress FIFO-B 212, an aligner 222, a deframer-B 220, a multiplexer 224, a framer 230, an egress FIFO-A 232, an egress FIFO B 234, a multiplexer 240, a multiplexer 236, a multiplexer 238 and a multiplexer 242.

Additionally, the clock control logic 214 within the traffic card 106 is coupled to a phase locked loop (PLL) circuitry 216 (that is external to the traffic card 106). In an embodiment, the PLL circuitry 216 is analog circuitry that comprises a phase detector, a low-pass filter and a voltage-controlled oscillator, as is known in the art. In one embodiment, the PLL circuitry 216 generates a clock that serves as a local clocking source for the traffic card 106. In an embodiment, the PLL circuitry 216 receives the primary receiving clock 116 as the input in its generation of the clock. While FIG. 2 illustrates the phase locked loop circuitry as external to the traffic card 106, embodiments of the invention are not so limited, as such circuitry can be incorporated into the traffic card 106.

The ingress FIFO-A 210 is coupled to receive the primary transmitting data 110 and the primary transmitting clock signal 112. The ingress FIFO-B 212 is coupled to receive the secondary transmitting clock 120 and the secondary transmitting data 118. Additionally the clock control logic 214 is coupled to receive the primary transmitting clock 212 and the secondary transmitting clock 120. The clock control logic 214 is coupled to transmit the primary transmitting clock 112 to the PLL circuitry 216. The PLL circuitry 216 outputs a clock signal, which, in an embodiment, serves as a local clock source for the traffic card 106. This clock signal is transmitted back to the clock control logic 214. The clock control logic 214 is coupled to the aligner 222, the multiplexer 240, the multiplexer 238, the deframer-A 218, the deframer-B 220, the egress FIFO-A 232 and the egress FIFO-B 234, such that the clock control logic 214 forwards this clock signal to the aligner 222, the multiplexer 240, the multiplexer 238, the deframer-A 218, the deframer-B 220, the egress FIFO-A 232 and the egress FIFO-B 234.

The output of the ingress FIFO-A 210 is coupled to an input of the deframer-A 218. The output of the ingress FIFO-B 212 is coupled to the input of the deframer-B 220. The output of the deframer-A 218 is coupled to an input of the multiplexer 224. The output of the defamer-B 220 is coupled to a different input of the multiplexer 224. The output of the multiplexer 224 is the data 130 that is outputted from the traffic card 106. Additionally, the deframer-A 218 outputs a sync pulse-A 252 that is inputted into the aligner 222. The deframer-B 220 outputs a sync pulse-B 250 that is inputted into the aligner 222. As will be described in more detail below, the aligner 222 determines a difference in the alignment of the data being received by the deframer-A 218 and data being received by the deframer-B 220 based on the sync pulse-A 252 and the sync pulse-B 250, respectively. In one embodiment the sync pulse-A 252 and the sync pulse-B 250 are representative of the points within the data wherein a frame begins within the data being received by the deframer-A 218 and the deframer-B 220, respectively.

An output of the clock control logic 214 is coupled to the aligner 222. In one embodiment, this output indicates which is the primary and which is the secondary FIFO. This output is also transmitted to the multiplexer 224 (through a coupling not shown). Accordingly, the multiplexer 224 outputs the data from the primary deframer as the data 130 during operation.

The aligner 222 is coupled to the ingress FIFO-A 210 and the ingress FIFO-B 212. The aligner 222 is coupled to the egress FIFO-A 232 and the egress FIFO-B 234. As will be described in more detail below, the aligner 222 transmits a signal to the ingress secondary FIFO, either ingress FIFO-A 210 or ingress FIFO-B 212, to adjust the occupancy of the data therein to enable the occupancy of the ingress secondary FIFO to be in sync with the occupancy of the ingress primary FIFO. In one embodiment, the aligner 222 transmits a signal to the egress secondary FIFO, either the egress FIFO-A 232 or the egress FIFO-B 234, to adjust the occupancy of the data therein. In an embodiment, the change in occupancy between the ingress secondary FIFO and the egress secondary FIFO is inversely proportional. For example, if the aligner 222 transmits a signal to the egress secondary FIFO to decrease its occupancy by two entries, the aligner 222 transmits a signal to the ingress secondary FIFO to increase its occupancy by two entries.

The framer 230 is coupled to receive the data 132. Additionally, the output of the framer 230 is coupled into the input of the egress FIFO-A 232 and the egress FIFO-B 234. The output of the framer 230 is also coupled to an input of the multiplexer 236 and to an input of the multiplexer 242. The output of the egress FIFO-A 232 is coupled to an input of the multiplexer 236. Additionally, the output of the egress FIFO-B 234 is coupled to an input of the multiplexer 242. The output of the multiplexer 236 is the primary receiving data 114. The output of the multiplexer 240 is the primary receiving clock 116.

Further, the output of the multiplexer 238 is the secondary receiving clock 124, while the output of the multiplexer 242 is the secondary receiving data 122. The operations of the traffic card 106 in connection with the primary control card 102 and a secondary control card 104 will be described in more detail below in conjunction with the flow diagram 300 of FIG. 3.

Figure 3:
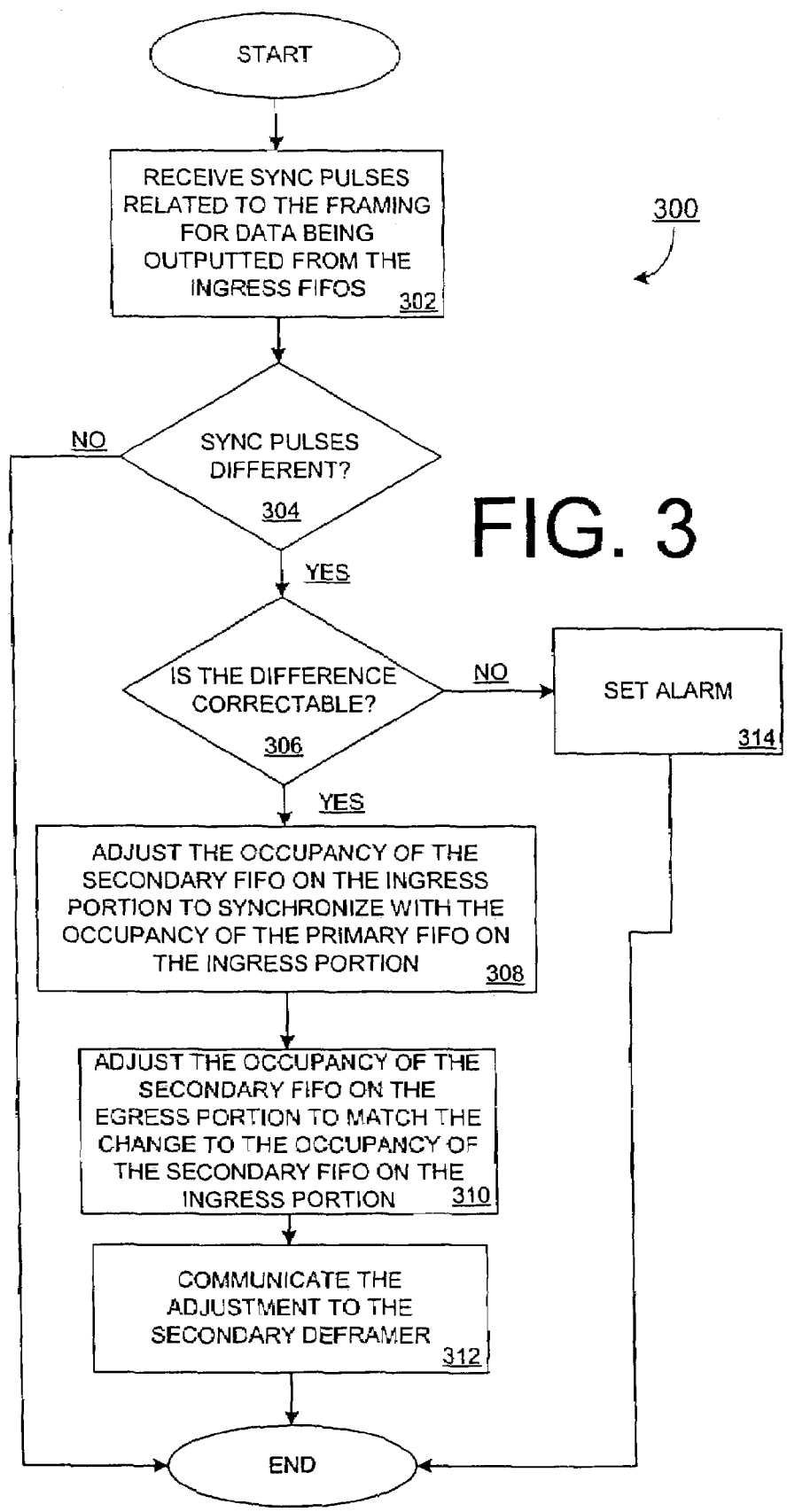
FIG. 3 illustrates a flow diagram for aligning the primary and the secondary signals being received into a traffic card to allow for hitless switching, according to one embodiment of the invention.

In particular, FIG. 3 illustrates a flow diagram for aligning the primary and the secondary signals being received into a traffic card to allow for hitless switching, according to one embodiment of the invention. In other words, such alignment enables the switching from the primary control card 102 to the secondary control card 104 without a loss of data, while keeping the clocking and frame alignment for such data in sync.

In block 302, sync pulses related to the framing of the data being outputted from the ingress FIFOs are received. With reference to the exemplary embodiment of FIG. 2, the aligner 222 receives the sync pulses 252 and 250 from the deframer-A 218 and the deframer-B 220, respectively. In an embodiment, during initialization of the network element 100, the occupancy of the ingress FIFO-A 210, the ingress FIFO-B 212, the egress FIFO-A 232 and the egress FIFO-B 234 are set to one-half of their depth, thereby reducing the probability that the ingress FIFO-A 212, the ingress FIFO-B 212, the egress FIFO-A 232 and the egress FIFO-B 234 will overflow or underflow during operation.

Figure 4:
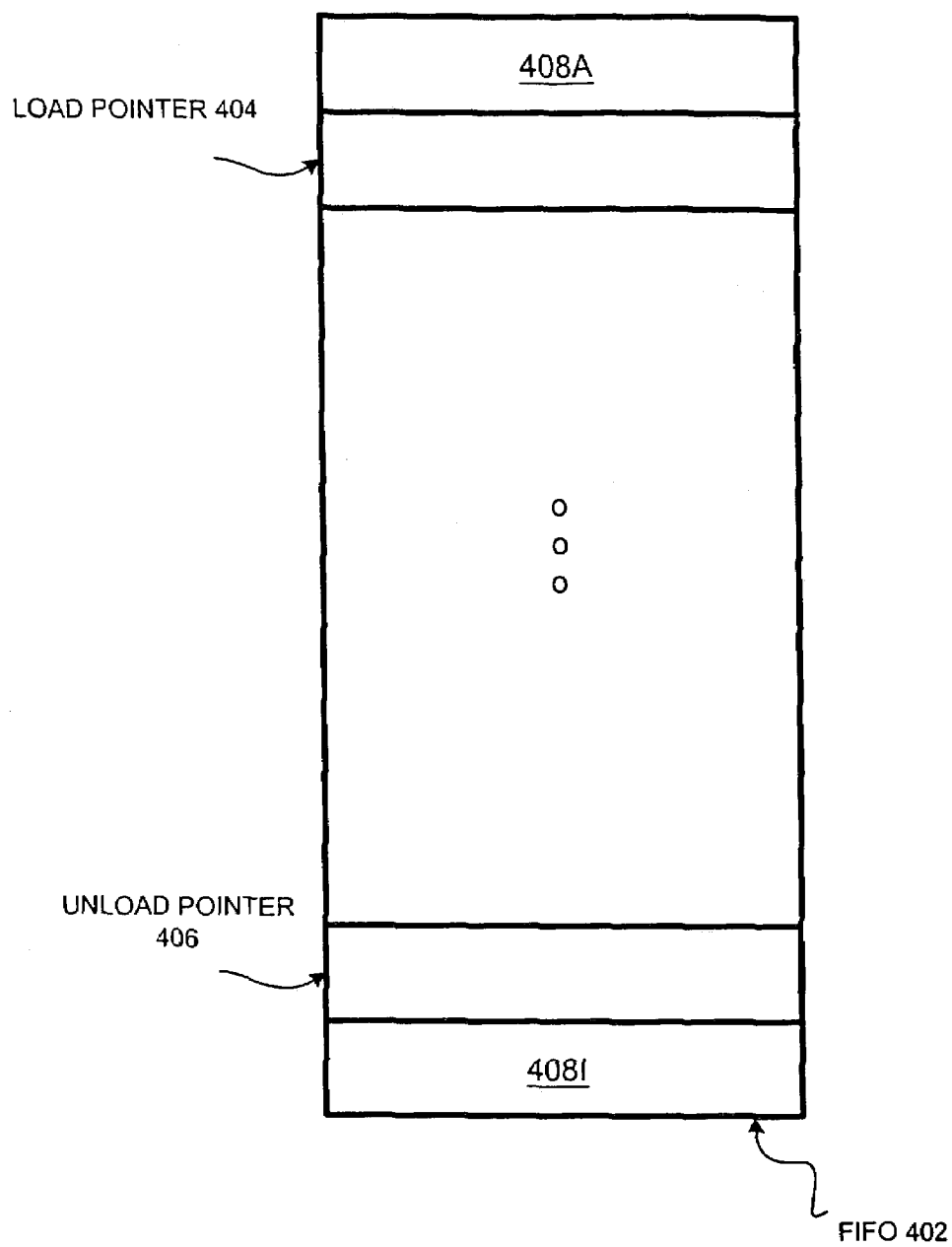
FIG. 4 is a FIFO memory, according to one embodiment of the invention.

To better illustrate, FIG. 4 is a FIFO memory, according to one embodiment of the invention. FIG. 4 includes a FIFO 402 that comprises a number of entries 408A–I. In one embodiment, the entries 408 are portions of frames being received from or transmitted to the primary control card 102 and the secondary control card 104. In an embodiment, the FIFO 402 is a circular FIFO. A load pointer 404 is employed to track the current available entry within the FIFO 402 wherein the data can be stored. An unload pointer 406 is employed to track the entry that is to be extracted from the FIFO 402 in the next available cycle. For example, in an embodiment, the unload pointer 406 tracks the entry that has been stored in the FIFO 402 for the longest period of time relative to the other entries therein. In one embodiment, during initialization of the network element 100, the load pointer 404 for the ingress FIFO-A 210, the ingress FIFO-B 212, the egress FIFO-A 232 and the egress FIFO-B 234 is set to the entry that is located at a depth of one-half of the depth of the FIFO.

During operation, the primary control card 102 inputs the primary receiving data 110 into the ingress FIFO-A 210 based on the primary receiving clock 112. In an embodiment, the primary receiving data 110 is stored within the ingress FIFO-A 210 at the entry that the load pointer 404 is pointing. Additionally, the deframer-A 218 unloads data from the ingress FIFO-A 210 based on the clock generated by the PLL circuitry 216. The deframer-B 220 unloads the data from the ingress FIFO-B 212 based on the clock generated by the PLL circuitry 216. As described above, in an embodiment, the data being unloaded from the ingress FIFO-A 210 and the ingress FIFO-B 212 are a number of frames, such that for a given clock cycle the data being unloaded is a portion of a frame.

In an embodiment, the deframer-A 218 and the deframer-B 220 locate the beginning of these data frames based on data patterns within the control portion of the frame. In particular, the deframer-A 218 and the deframer-B 220 locate the beginning of these data frames based on a pre-defined bit pattern within such frames. Once the deframer-A 218 and the deframer-B 220 are locating the frame alignment within the data being unloaded from the ingress FIFO-A 210 and the ingress FIFO-B 212, respectively, such deframers are considered in sync. While embodiments of the invention are described such that the deframer-A 218 and the deframer-B 220 discover the frame alignment from the data being unloaded, in other embodiments, the frame alignment of such data can be discovered by other means and/or approaches. For example, in an embodiment, a framing signal could be transmitted from the primary control card 102 and the secondary control card 104 indicating the frame alignment of such data. Accordingly, this frame alignment signal could be transmitted to the deframer-A 218 and the deframer-B 220.

In an embodiment, the deframer-A 218 and the deframer-B 220 generate the sync pulses 252 and 250, respectively, when the frame alignment for the data being unloaded has been discovered. In one embodiment, the deframer-A 218 and the deframer-B 220 generate the sync pulses 252 and 250, respectively, when a beginning of a frame is located within the data being unloaded. Accordingly, the aligner 222 receives these sync pulses 252 and 250.

In block 304, a determination is made on whether the sync pulses are different. With reference to the exemplary embodiment illustrated in FIG. 2, the aligner 222 determines whether the sync pulses 252 and 250 are different. In one embodiment, the sync pulses 252 and 250 are integer values representative of points in time indicating when the beginning of a frame is received from the ingress FIFO-A 210 and the ingress FIFO-B 212, respectively. The aligner 222 determines whether the sync pulses 252 and 250 are different by comparison of the two values. For example, the sync pulse 252 could have a value of 50, while the sync pulse 250 could have a value of 52. Accordingly, the ingress FIFO-A 210 is being unloaded at a slower rate in comparison to the ingress FIFO-B 212. In particular, the deframer-B 220 has unloaded two more entries from the ingress FIFO-B 212 in comparison to the unloading of the ingress FIFO-A 210 by the deframer-A 218. Upon determining that the sync pulses are the same, the unloading of the ingress FIFO-A 210 is considered in sync with the unloading of the ingress FIFO-B 212 and the flow diagram 300 is complete.

In block 306, upon determining that the sync pulses are different, a determination is made on whether the difference is correctable. In an embodiment, if the adjustment to the secondary FIFO causes the FIFO to underflow or overflow, the difference is not considered correctable. In particular, if the aligner 222 modifies the adjustment of the unload pointer such that the pointer is below the minimum depth or beyond the maximum depth of the FIFO, this causes the FIFO to underflow or overflow, respectively.

In block 308, upon determining that the difference is correctable, the occupancy of the secondary FIFO on the ingress portion is adjusted to synchronize with the occupancy of the primary FIFO on the ingress portion. With reference to the exemplary embodiment illustrated in FIG. 2 (assuming that the ingress FIFO-B 212 is the secondary FIFO), in one embodiment, the aligner 222 adjusts the occupancy of the depth of the ingress FIFO-B 212. In an embodiment, the aligner 222 adjusts the unload pointer for the ingress FIFO-B 212 such that the occupancy of the ingress FIFO-B 212 is synchronized with the occupancy of the ingress FIFO-A 210. For example, if the occupancy of the ingress FIFO-B 212 is ahead by three entries (in comparison to the occupancy of the ingress FIFO-A 210), the aligner 222 moves the unload pointer for the ingress FIFO-B 212 by three entries.

In an embodiment, the aligner 222 modifies the unload rate of the ingress FIFO-B 212 by communications with the ingress FIFO-B 212 to increase or retard its unload rate. For example, if the occupancy of the ingress FIFO-B 212 is two entries greater than the occupancy of the ingress FIFO-A 210, the aligner 222 could cause the ingress FIFO-B 212 to output two entries for a given clock cycle for two clocks (when, during normal operation, one entry is outputted for a given clock cycle). Accordingly, after two clock cycles, the occupancy of the ingress FIFO-A 210 would be synchronized with the occupancy of the ingress FIFO-B 212. However, embodiments of the invention are not limited to such adjustments. For example, in another embodiment, the aligner 222 could cause the ingress FIFO-B 212 to output three entries across two clock cycles. In such an embodiment, the Grey code rule is not violated in that only one bits changes on a given clock transition.

In another embodiment, the aligner 222 could transmit communications to the secondary deframer, wherein the secondary deframer performs the adjustments to synchronize the occupancy of the primary and secondary ingress FIFOs. For example, in an embodiment where the unload rate for the secondary FIFO needs to be retarded, (assuming the deframer-B 220 is the secondary deframer) the deframer-B 220 could retard the unload rate of the ingress FIFO-B 212 by not reading data from the ingress FIFO-B 212 from a number of clock cycles.

In one embodiment, the aligner 222 causes the adjustments of the occupancy of the secondary FIFO based on when a given part of the frame is being unloaded. For example, assume that the data frames being outputted from the ingress FIFO-A 210 and the ingress FIFO-B 212 are SONET frames, wherein the A1 and A2 bytes are the data used by the deframers in determining frame alignment. In an embodiment, the aligner 222 could cause the adjustment to be made within the overhead of the SONET frame but prior to the A1 and A2 bytes for the given frame. In particular, the SONET frame is a fixed number of bytes. Based on the sync pulses being received indicating the beginning of a given frame, the aligner 222 knows the location of the A1 and A2 bytes for the frames and can make the adjustment based on their locations.

In block 310, upon adjusting the occupancy of the secondary FIFO on the ingress portion, the occupancy of the secondary FIFO on the egress portion is adjusted to match the change to the occupancy of the secondary FIFO on the ingress portion.

In block 312, upon adjusting the occupancy of the secondary FIFO on the egress portion, the adjustment is communicated to the secondary deframer.

In block 314, upon determining that the difference is not correctable (in block 306), an alarm is set to indicate an alternative form of correction is necessary.

Phase Adjustment

Figure 5:
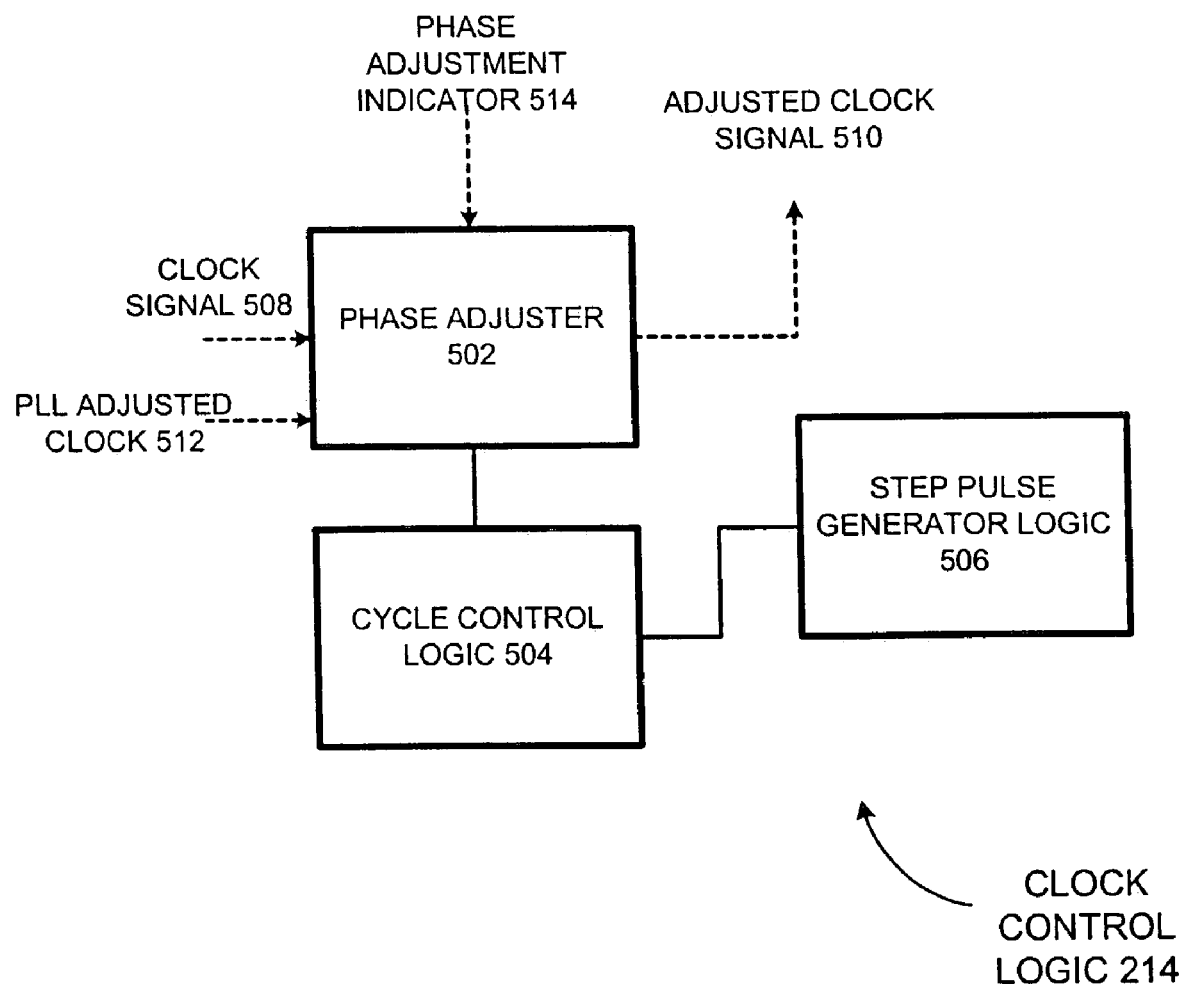
FIG. 5 illustrates a more detailed block diagram of a clock control logic that allows for phase adjustment of a clock signal, according to one embodiment of the invention.

As described, after a number of switches between the two different control cards and the associated clock sources, the ingress FIFOs 210/212 can underflow or overflow. Accordingly, an embodiment of the invention allows for the phase adjustment of the clocks signal driving the ingress FIFOs 210/212 to preclude this underflow or overflow of such FIFOs. FIG. 5 illustrates a more detailed block diagram of a clock control logic that allows for phase adjustment of a clock signal, according to one embodiment of the invention. FIG. 5 illustrates a more detailed block diagram of the clock control logic 214 (shown in FIG. 2). The clock control logic 214 includes a phase adjuster 502 coupled to a cycle control logic 504 that is coupled to a step pulse generator logic 506. As shown, the phase adjuster 502 is coupled to receive a clock signal 508 and a phase adjustment indicator signal 514 and is coupled to output an adjusted clock signal 510. As will be described in more detail below, the step pulse generator logic 506 and the cycle control logic 504 are to control the timing of the adjustments of the clock signal 508 within the phase adjuster 502 to generate the adjusted clock signal 510.

In one embodiment, the phase adjuster 502 includes a number of different modes, which are described below. In an embodiment, the phase adjuster 502 is in a bypass mode, wherein the phase adjuster 502 does not adjusts the clock signal 508. In an embodiment, the phase adjuster 502 is in a calibration mode, wherein the phase adjuster 502 determines the amount of delay to be set to allow for one cycle of adjustment in the phase of the clock signal 508. In one embodiment, the phase adjuster 502 is in an adjustment mode, wherein the phase adjuster 502 performs a phase adjustment for the clock signal 508. In an embodiment, the phase adjuster 502 is in a manual mode, wherein software and/or an administrator can set the amount of delay for the clock signal 508.

Figure 6:
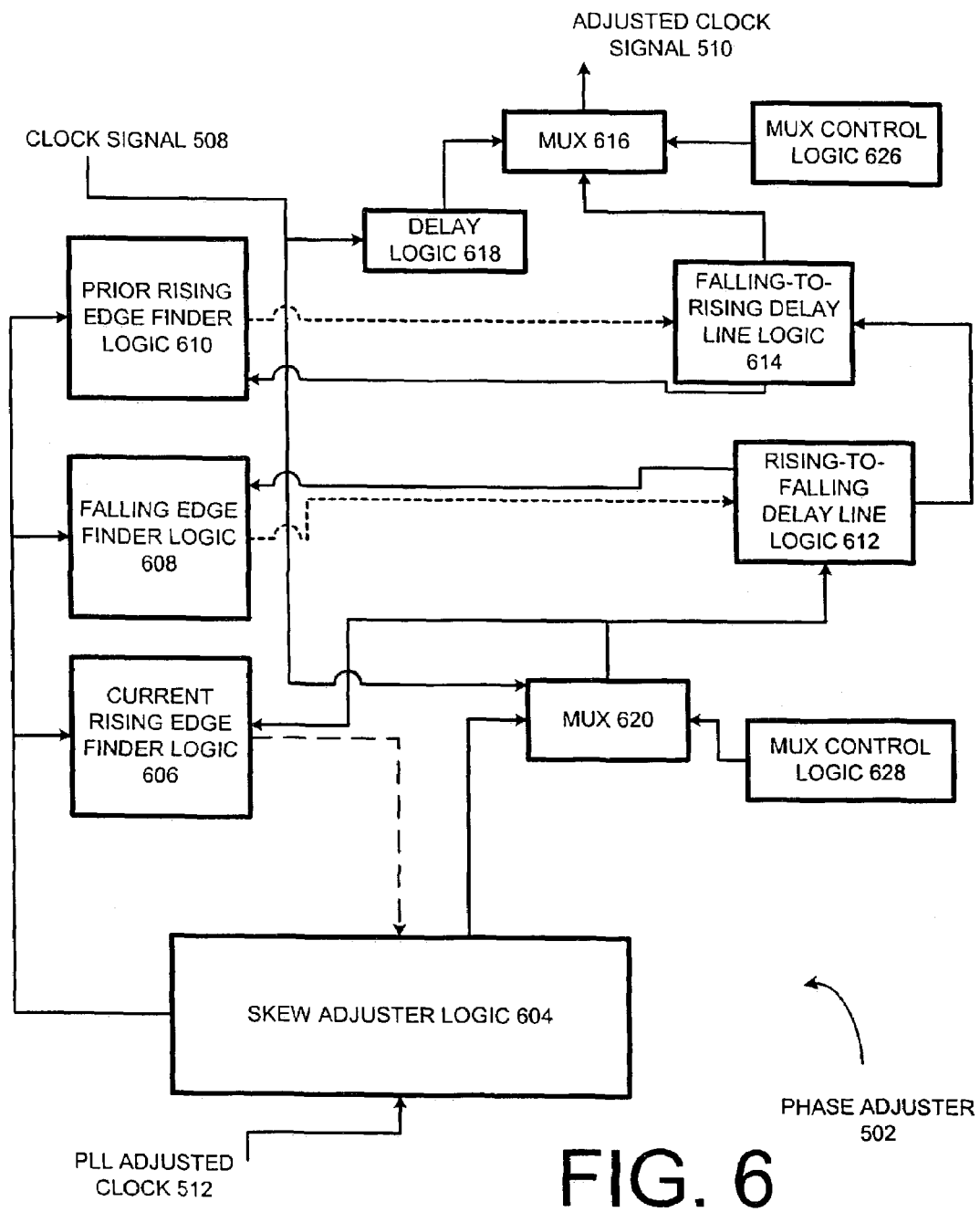
FIG. 6 illustrates a more detailed block diagram of a phase adjuster, according to one embodiment of the invention.

FIG. 6 illustrates a more detailed block diagram of a phase adjuster, according to one embodiment of the invention. As shown, the phase adjuster 502 receives the clock signal 508 and generates the adjusted clock signal 510. The phase adjuster 502 includes a prior rising edge finder logic 610, a falling edge finder logic 608, a current rising edge finder logic 606, a skew adjuster logic 604, a delay logic 618, a multiplexer 616, a multiplexer control logic 626, a falling-to-rising delay line logic 614, a rising-to-falling delay line logic 612, a multiplexer 620 and a multiplexer control logic 628.

The clock signal 508 is coupled to an input of the delay logic 618 and an input of the multiplexer 620. An output of the delay logic 618 is coupled to an input of the multiplexer 616. As shown, when a phase adjustment of the clock signal 508 is not occurring, the clock signal 508 is routed to the delay logic 618 and out from the phase adjuster 502 through multiplexer 616. Conversely, when a phase adjustment of the clock signal 508 is occurring, the clock signal 508 is routed to the multiplexer 620 (which is described in more detail below). In one embodiment, the delay logic 618 includes a number of gate delays that is equal to a minimum delay for the rising-to-falling delay line logic 612 and the falling-to-rising delay line logic 614. Accordingly, when a switch occurs between performing and not performing a phase adjustment (and vice versa), there is not a significant change in the phase of the clock signal 508.

An output of the multiplexer control logic 626 is coupled to an input of the multiplexer 616. The adjusted clock signal 510 is an output of the multiplexer 616. The output of the multiplexer control logic 628 is coupled to an input of the multiplexer 620.

The PLL adjusted clock signal 512 is coupled to an input of the skew adjuster logic 604. An output of the current rising edge finder logic 606 is coupled to an input of the skew adjuster logic 604. An output of the skew adjuster logic 604 is coupled an input of the multiplexer 620. A second output of the skew adjuster logic 604 is coupled to an input of the current rising edge finder logic 606, an input of the falling edge finder logic 608 and an input of the prior rising edge finder logic 610.

The output of the multiplexer 620 is coupled to an input of the current rising edge finder logic 606 and to an input of the rising-to-falling delay line logic 612. The output of the rising-to-falling delay line logic 612 is coupled to an input of the falling-to-rising delay line logic 614. An output of the falling-to-rising delay line logic 614 is coupled to a second input of the multiplexer 616. As will be described in more detail below, the rising-to-falling delay line logic 612 sets a delay between a rising and a falling edge of the clock signal 508, while the falling-to-rising delay line logic 614 sets a delay between a falling and a rising edge of the clock signal 508. Accordingly, the two delay line logic 612 and 614 causes one cycle of delay for the clock signal 508.

Further, in one embodiment, the delay lines within the delay ling logic 612 and 614 include a same type and same number of gates within the delay cells therein. Additionally, in an embodiment, a load on these gates is the same. Accordingly, the duty cycle of the clock signal 508 remains approximately constant as any distortion introduced into the clock signal 508 by a given gate can be canceled out by the distortion introduced into the clock signal 508 by a next gate within the delay cells.

An output of the falling edge finder logic 608 is coupled to an input of the rising-to-falling delay line logic 612. An output of the rising-to-falling delay line logic 612 is coupled to an input of the falling edge finder logic 608. An output of the prior rising edge finder logic 610 is coupled to an input of the falling-to-rising delay line logic 614. An output of the falling-to-rising delay line logic 614 is coupled to an input of the prior rising edge finder logic 610.

Figure 7:
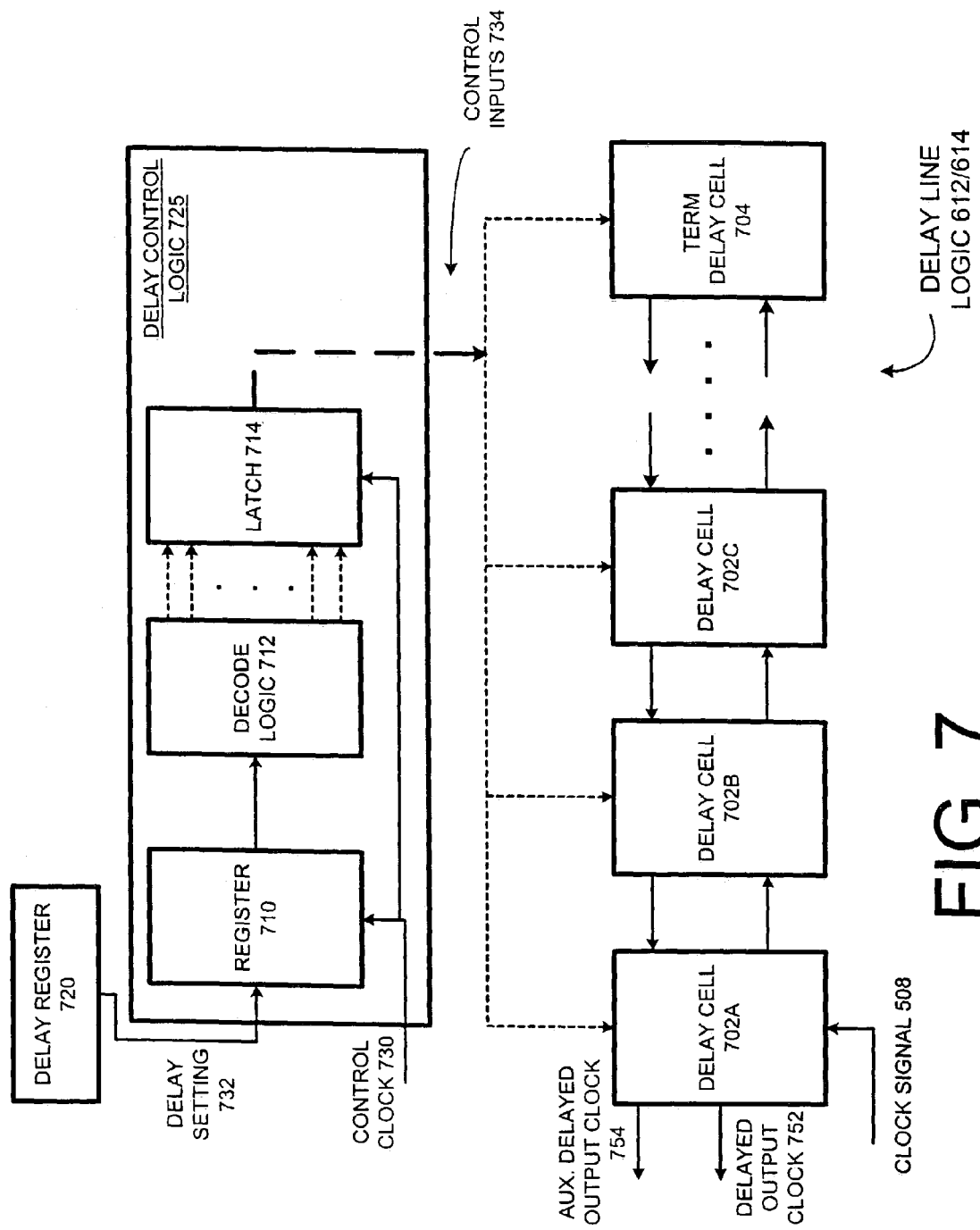
FIG. 7 illustrates a more detailed block diagram of a delay line logic, according to one embodiment of the invention.

FIG. 7 illustrates a more detailed block diagram of a delay line logic, according to one embodiment of the invention. In particular, FIG. 7 illustrates a more detailed block diagram of the rising-to-falling delay line logic 612 or the falling-to-rising delay line logic 614, according to one embodiment of the invention. As shown, the delay line logic 612/614 includes a delay control logic 725 to generate control inputs 734 to be inputted into delay cells 702A–C and a termination delay cell 704. The number of delay cells 702 can be greater or lesser than the number illustrated in FIG. 7.

The delay cell 702A is coupled to receive the clock signal 508 from the multiplexer 620 (not shown in FIG. 7). The delay cell 702A is coupled to the delay cell 702B. The delay cell 702B is coupled to the delay cell 702C. The delay cell 702C is coupled to the termination delay cell 704. As shown, the delay cell 702A outputs the delayed output clock 752 and the auxiliary delayed output clock 754, which, in an embodiment, are based on the clock signal 508 that is routed through the one to a number of the delay cells 702 and/or the termination delay cell 704.

In one embodiment, a given delay cell 702 is in a loop back or a pass through mode. If a delay cell 702 is in a loop back mode, the clock signal received is returned back out from the delay cell without passing the clock signal to a different delay cell in the delay line. Conversely, if a delay cell 702 is in a pass through mode, the clock signal received is forwarded to the next delay cell 702 within the delay line. To help illustrate, assume that the delay cell 702A is in a pass through mode and the delay cell 702B is in a loop back mode. In operation, the delay cell 702A receives the clock signal 508 and forwards the signal to the delay cell 702B. The delay cell 702B reroutes the clock signal 508 back to the delay cell 702A. A more detailed block diagram of a delay cell 702 is described in more detail below in conjunction with FIG. 9.

In one embodiment, the delay control logic 725 generates the control inputs 734 that set the delay cells 702/704 in a loop back or pass through mode. As shown, the delay control logic 725 includes a register 710, a decode logic 712 and a latch 714. The register 710 is coupled to receive the delay setting 732 from the delay register 720. Additionally, the register 710 is coupled to receive the control clock 730. In one embodiment, the delay setting 732 includes an encoded value representative of the number of delay cells 702/704 that the clock signal 508 is to be routed through. In one embodiment, the decode logic 712 receives this encoded value from register 710 and decodes this value into individual values that are inputted by the latch 714 into the delay cells 702/704.

Figure 8:
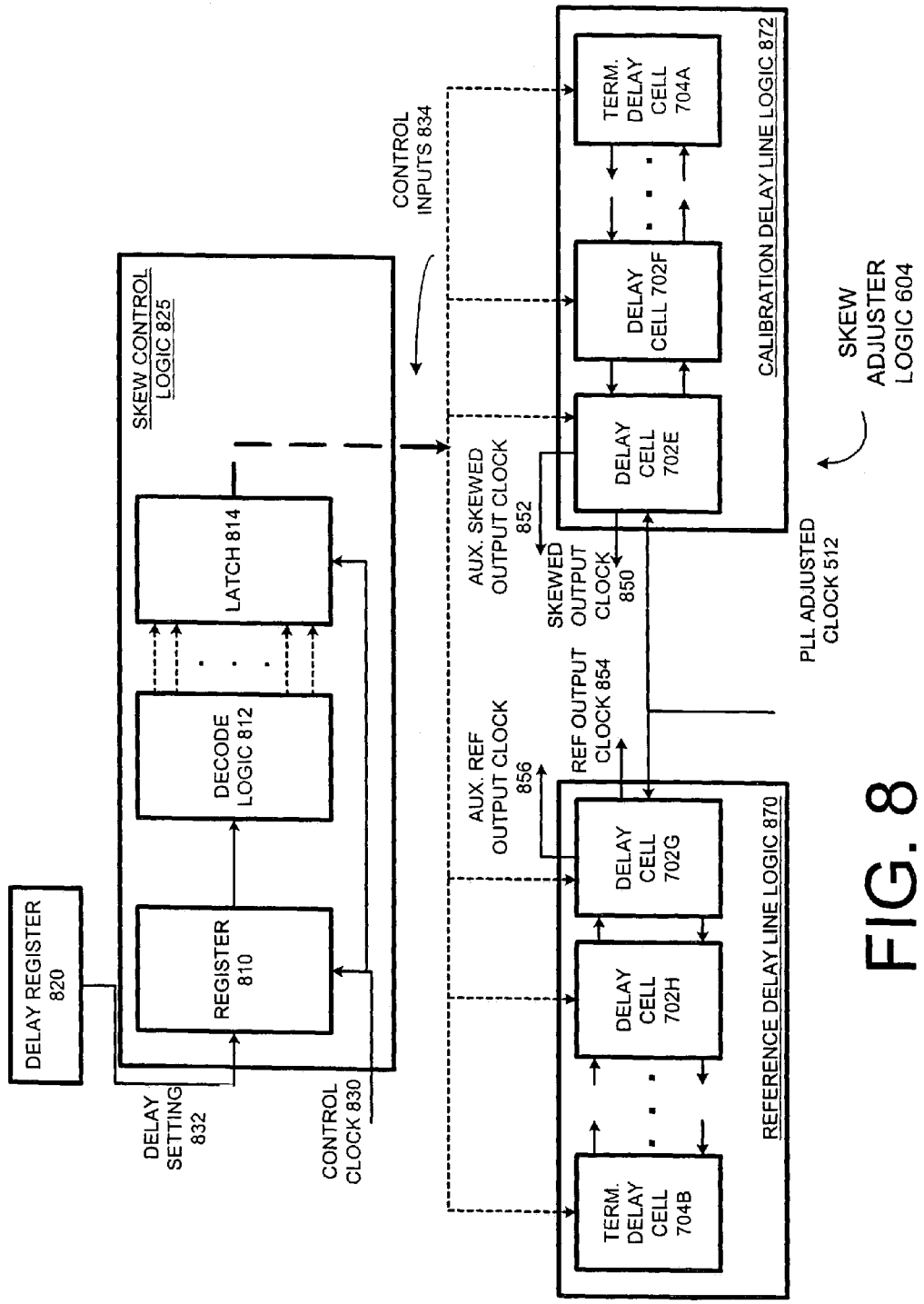
FIG. 8 illustrates a more detailed block diagram of a skew adjuster logic within a phase adjuster, according to one embodiment of the invention.

FIG. 8 illustrates a more detailed block diagram of a skew adjuster logic within a phase adjuster, according to one embodiment of the invention. In particular, FIG. 8 illustrates a more detailed block diagram of the skew adjuster logic 604 within the phase adjuster 502, according to one embodiment of the invention. As will be described in more detail below, the skew adjuster logic 604 is in operation during a calibration mode for the phase adjuster 502. The skew adjuster logic 604 generates output that is representative of differences in time of traversal of a clock signal through a first number of delay cells and a second number of delay cells. In an embodiment, this output is employed in determining how many delay cells are in a one-half cycle of a clock signal, thereby allowing for an adjustment in the clock signal by one cycle (one-half cycle delay in the rising-to-falling delay line logic 612 and one-half cycle delay in the falling-to-rising delay line logic 614).

As shown, the skew adjuster logic 604 includes a skew control logic 825 coupled to receive a delay setting 832 from a delay register 820. The skew control logic 825 is also coupled to receive a control clock 830. Additionally, the skew control logic 825 is coupled to a reference delay line logic 870 and a calibration delay line logic 872 through control inputs 834. The reference delay line logic 870 and the calibration delay line logic 872 are coupled to receive the clock signal 508. The reference delay line logic 870 and the calibration delay line logic 872 are respectively coupled to output: 1) a reference output clock 854 and an auxiliary reference output clock 856; and 2) a skewed output clock 850 and an auxiliary skewed output clock 852.

The calibration delay line logic 872 includes a delay cell 702E, a delay cell 702F and a termination delay cell 872. The delay cell 702E is coupled to receive the clock signal 512. The delay cell 702E is coupled to the delay cell 702F. The delay cell 702F is coupled to the termination delay cell 704A. As shown, the delay cell 702E outputs the skewed output clock 850 and the auxiliary skewed output clock 852, which, in an embodiment, are based on the clock signal 512 that is routed through the one to a number of the delay cells 702 and/or the termination delay cell 704. The number of delay cells 702 within the calibration delay line logic 872 and the reference delay line logic 870.

The reference delay line logic 870 includes a delay cell 702G, a delay cell 702H and a termination delay cell 704B. The delay cell 702G is coupled to receive the clock signal 512. The delay cell 702G is coupled to the delay cell 702H. The delay cell 702H is coupled to the termination delay cell 704B. As shown, the delay cell 702G outputs the reference output clock 854 and the auxiliary reference output clock 856, which, in an embodiment, are based on the clock signal 508 that is routed through the one to a number of the delay cells 702 and/or the termination delay cell 704B. The number of delay cells 702 within the calibration delay line logic 872 and the reference delay line logic 870.

The skew control logic 825 includes a register 810, a decode logic 812 and a latch 814. The register 810 is coupled to receive the delay setting 832 and the control clock 830. In one embodiment, the delay setting 832 includes an encoded value of a difference in the number of delay cells 702/704 for a given calibration. In one embodiment, the decode logic 812 receives this encoded value from register 810 and decodes this value into individual values that are inputted by the latch 814. These values are latched into the delay cells 702/704 (as shown by the control inputs 834). In one embodiment, a value transmitted to a given delay cell 702/704 indicates whether the delay cell 702/704 is in a loop back or pass through mode (as described above in conjunction with FIG. 7).

Figure 9:
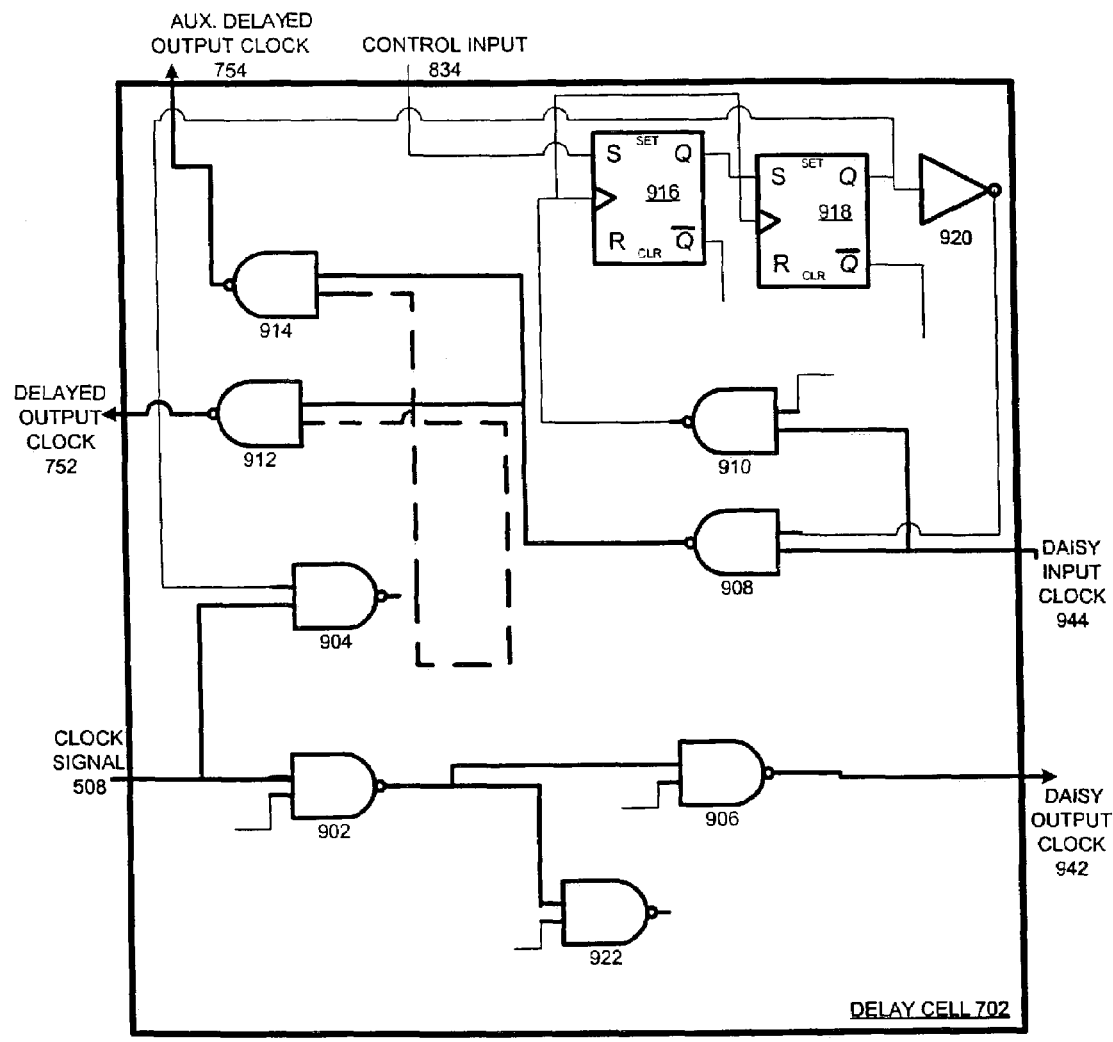
FIG. 9 illustrates a more detailed block diagram of a delay cell within a phase adjuster, according to one embodiment of the invention.

FIG. 9 illustrates a more detailed block diagram of a delay cell within a phase adjuster, according to one embodiment of the invention. In particular, FIG. 9 illustrates a more detailed block diagram of a delay cell 702 within the phase adjuster 502, according to one embodiment of the invention. In an embodiment, the delay cell 702 is in a pass through mode wherein the clock signal 508 is received and outputted as a daisy output clock 942 and is subsequently received back as a daisy input clock 944 after traversing a number of other delay cells within a delay line. The delay cell 702 outputs the daisy input clock 944 as the delayed output clock 752 and the auxiliary delayed output clock 754. In one embodiment, the delay cell 702 is in a loop back mode wherein the clock signal 508 is outputted back from the delay cell 702 as the delayed output clock 752 and the auxiliary delay output clock 754, without traversing a subsequent delay cell in the delay line. The control input 734 determines whether the delay cell 702 is set in a pass through or loop back mode.

As shown, the delay cell 702 comprises a NAND gate 902, a NAND gate 904, a NAND gate 906, a NAND gate 908, a NAND gate 910, a NAND gate 912, a NAND gate 914, a NAND gate 922, a flip flop 916, a flip flop 918 and an inverter 920. The clock signal 508 is coupled to an input of the NAND gate 902 and an input of the NAND gate 904. A second input of the NAND gate 902 is coupled to a signal having a "high" value. The output of the NAND gate 904 is coupled to an input of the NAND gate 922 and an input of the NAND gate 906. The second input of the NAND gate 922 is coupled to a signal having a "high" value, while the second input of the NAND gate 906 is coupled to a signal having a "high" value. The output of the NAND gate 906 is coupled to the daisy output clock 942. In an embodiment, the daisy output clock 942 is coupled as the clock signal 508 for a different delay cell 702.

In an embodiment, the daisy input clock 944 is received as a delayed output clock 752 from a different delay cell 702. The daisy input clock 944 is coupled to an input of the NAND gate 908 and an input of the NAND gate 910. A second input of the NAND gate 908 is coupled to the output of the inverter 920. A second input of the NAND gate 910 is coupled to a signal having a "high" value. The output of the NAND gate 908 is coupled to an input of the NAND gate 914 and to an input of the NAND gate 912.

The output of the NAND gate 910 is coupled to the control input of the flip flop 916 and the control input of the flip flop 918. The control input 834 is coupled to an input of the flip flop 916. The output of the flip flop 916 is coupled to the input of the flip flop 918. The output of the flip flop 918 is coupled to the input of the inverter 920 and to an input of the NAND gate 904. As shown, the flip-flops 916 and 918 are double sync logic to ensure that the output therefrom is correct. In particular, this double sync logic precludes the flip-flop 918 from being in a meta stable state during its output of data. For example, if the flip-flop 916 is in a meta stable state (because, for example, the data pulse is changing during the set up and/or hold times for the flip-flop 916), during the subsequent clocking of the data from the flip-flop 916 to the flip-flop 918, the flip-flop 918 does not see a change in the data pulse, thereby precluding the flip-flop 918 from being in a meta stable state when output the data.

The output of the NAND gate 904 is coupled to a second input of the NAND gate 912 and a second input of the NAND gate 914. The output of the NAND gate 912 is coupled as the delay output clock 752. The output of the NAND gate 914 is coupled as the auxiliary delay output clock 754.

In one embodiment, the termination delay cell 704 is scaled down version of the delay cell 702 illustrated in FIG. 9. In particular, in an embodiment, the termination delay cell 704 is the gates that the signal passes when the delay cell 702 is in a loop-back mode (the NAND gate 902, the NAND gate 904, the NAND gate 912 and the NAND gate 914).

Figure 10:
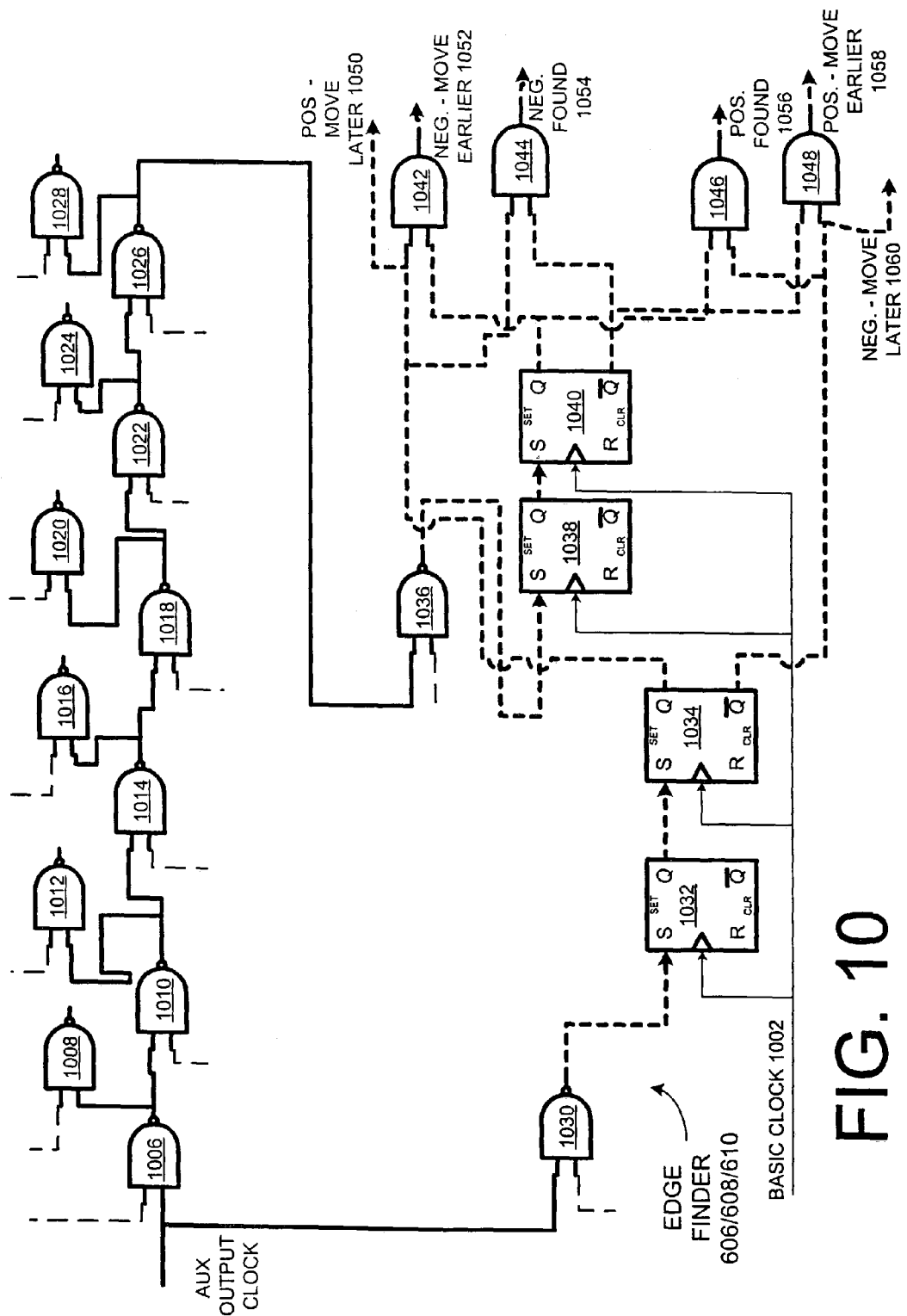
FIG. 10 illustrates a more detailed block diagram of an edge finder logic within a phase adjuster, according to one embodiment of the invention.

FIG. 10 illustrates a more detailed block diagram of an edge finder logic within a phase adjuster, according to one embodiment of the invention. In particular, FIG. 10 illustrates a more detailed block diagram of the current rising edge finder logic 606, the falling edge finder logic 608 or the prior rising edge finder logic 610 within the phase adjuster 502, according to one embodiment of the invention. In an embodiment, the edge finder logic 606/608/610 are in operation during a calibration mode for the phase adjuster 502 to adjust the number of delay cells that the clock signal 508 passes during the adjustment mode to allow for one cycle of adjustment.

As shown, the edge finder logic 606/608/610 is coupled to receive a basic clock 1002 (in one embodiment, the reference output clock 854) and is coupled to receive an auxiliary output clock (the auxiliary skewed output clock 852 from the skew adjuster logic 604, the auxiliary delayed output clock 754 from the rising-to-falling delay line logic 612, and the auxiliary delayed output clock 754 from the falling-to-rising delay line logic 614 respectively for 606, 608, and 610). The output of the edge finder logic 606/608/610 includes a positive-move later signal 1050, a negative-move earlier signal 1052, a negative found signal 1054, a positive found signal 1056, a positive-move earlier signal 1058 and a negative-move later signal 1060. In an embodiment, the signals 1050–1060 are stored in a sequence control logic, wherein the sequence control logic updates the delay control logic 725 and the skew control logic 825 within the delay line logic 612/614 and skew adjuster logic 604, respectively. Accordingly, as will be described in more detail below, in one embodiment, the number of delay cells within the delay line logic 612/614 and the skew adjuster logic 604 are modified to allow for one cycle of adjustment.

As shown, the basic clock 1002 is coupled to a control input of a flip-flop 1032, the control input of a flip-flop 1034, the control input of flip-flop 1038 and the control input of 1040. As will be described in more detail below, the basic clock 1002 will control when the edge finder 606/608/610 is in operation.

The auxiliary output clock is coupled to an input of a NAND gate 1006 and an input of a NAND gate 1030. A second input of the NAND gate 1006 and the second input of the NAND gate 1030 are coupled to a high value (e.g., one). The output of the NAND gate 1006 is coupled to an input of a NAND gate 1008. A second input of the NAND gate 1008 is coupled to a high value. The output of the NAND gate 1006 is also coupled to an input of a NAND gate 1010.

A second input of the NAND gate 1010 is coupled to a high value. The output of the NAND gate 1010 is coupled to an input of a NAND gate 1012 and an input of a NAND gate 1014. A second input of the NAND gate 1012 and a second input of the NAND gate 1014 are coupled to a high value. The output of the NAND gate 1014 is coupled to an input of a NAND gate 1016 and an input of a NAND gate 1018. A second input of the NAND gate 1016 and a second input of the NAND gate 1018 are coupled to a high value.

The output of the NAND gate 1018 is coupled to an input of a NAND gate 1020 and an input of a NAND gate 1022. A second input of the NAND gate 1020 and a second input of the NAND gate 1022 are coupled to a high value. The output of the NAND gate 1022 is coupled to an input of a NAND gate 1024 and an input of a NAND gate 1026. A second input of the NAND gate 1024 and a second input of the NAND gate 1026 are coupled to a high value. The output of the NAND gate 1026 is coupled to an input of a NAND gate 1028 and an input of a NAND gate 1036. A second input of the NAND gate 1028 and a second input of the NAND gate 1036 are coupled to a high value.

The output of the NAND gate 1030 is coupled to an input of the flip-flop 1032. A non-inverted output of the flip-flop 1032 is coupled to an input of the flip-flop 1034. A non-inverted output of the flip-flop 1034 is coupled to an input of an AND gate 1042 and an input of an AND gate 1044. Additionally, the non-inverted output of the flip-flop 1034 is a positive-move later signal 1050. An inverted output of flip-flop 1034 is coupled to an input of an AND gate 1046 and an input of an AND gate 1048. Additionally, the inverted output of the flip-flop 1034 is a negative-move later signal 1060.

The output of the NAND gate 1036 is coupled to an input of the flip-flop 1038. A non-inverted output of the flip-flop 1038 is coupled to an input of the flip-flop 1040. A non-inverted output of the flip-flop 1040 is coupled to a second input of the AND gate 1042 and a second input of the AND gate 1046. An inverted output of the flip-flop 1040 is coupled to a second input of the AND gate 1044 and a second input of the AND gate 1048.

The output of the AND gate 1042 is a negative-move earlier signal 1052. The output of the AND gate 1044 is a negative found signal 1054. The output of the AND gate 1046 is a positive found signal 1056. The output of the AND gate 1048 is a positive-move earlier signal 1058. As shown, the NAND gates 1006–1028 serve as a delay line logic with six (6) gate delays. Initially the flip-flops 1032 and 1034 as well as the flip-flops 1038 and 1040 serve as double syncs as described above. Further, the AND gates 1042–1048 decode the delayed clock signal 1040 traveling through the delayed line 1006–1026 as well as the auxiliary output clock independent of traveling through such delay line to determine if a rising or falling edge is between the auxiliary output clock and the auxiliary output clock transmitted through the delay logic of the NAND gates 1006–1028. The operation of the edge finder 606/608/610 are described in more detail below.

Figure 11:
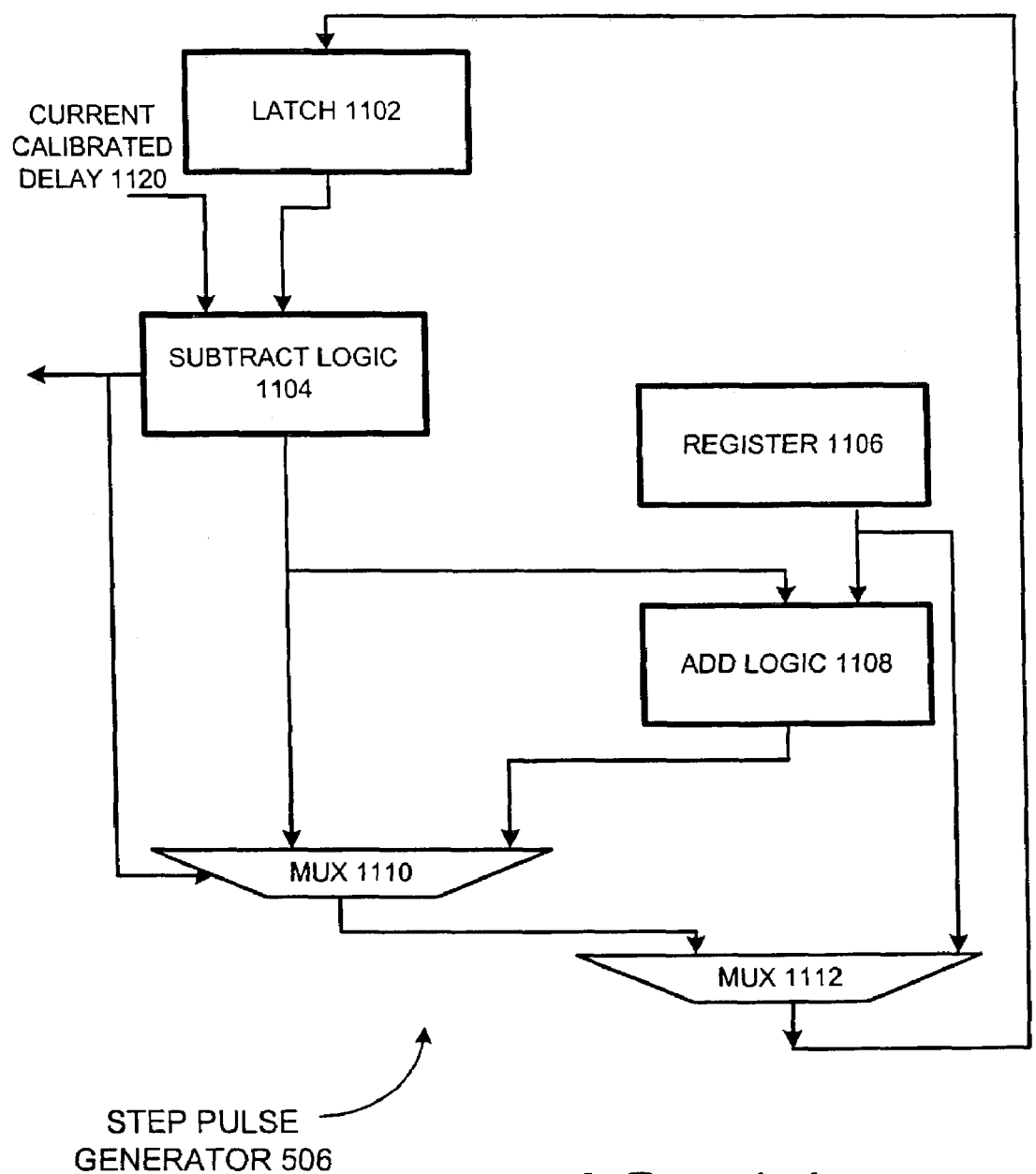
FIG. 11 illustrates a more detailed block diagram of step pulse generator for controlling a phase adjuster for a clock signal, according to one embodiment of the invention.

FIG. 11 illustrates a more detailed block diagram of step pulse generator for controlling a phase adjuster for a clock signal, according to one embodiment of the invention. In particular FIG. 11 illustrates a more detailed block diagram of the step pulse generator 506, according to one embodiment of the invention. As shown an input into the step pulse generator 506 includes a current calibrated delay 1120 (the sum of the value of the two registers 720 at the end of the calibration phase—block 1308) which is coupled to a subtract logic 1104. A second input into the step pulse generator 506 includes the value stored into a register 1106. An output of the step pulse generator 506 is outputted from the subtract logic 1104 that represents an indication of when an adjustment should be made within the phase adjuster 502. As will be described in more detail below, in one embodiment, this indication from the step pulse generator 506 causes the phase adjuster 502 to add or subtract a delay cell within the delay line logic 612 and/or the delay line logic 614.

This output from the step pulse generator 506 is also coupled as a control input into the multiplexer 1110. A second input into the subtract logic 1104 is coupled to an output of a latch 1102. In one embodiment, the latch 1102 is an accumulation register. The output of the subtract logic 1104 is coupled as an input of the multiplexer 1110 and to an input of an add logic 1108. The output of the register 1106 is coupled as a second input into the add logic 1108 and to an input of a multiplexer 1112. The output of the add logic 1108 is coupled as a second input into the multiplexer 1110. The output of the multiplexer 1110 is coupled as a second input into the multiplexer 1112. The output of the multiplexer 1112 is coupled as an input into the latch 1102. The operations of the step pulse generator 506 will be described in more detail below.

Operation of the Phase Adjuster 502

Figure 12:
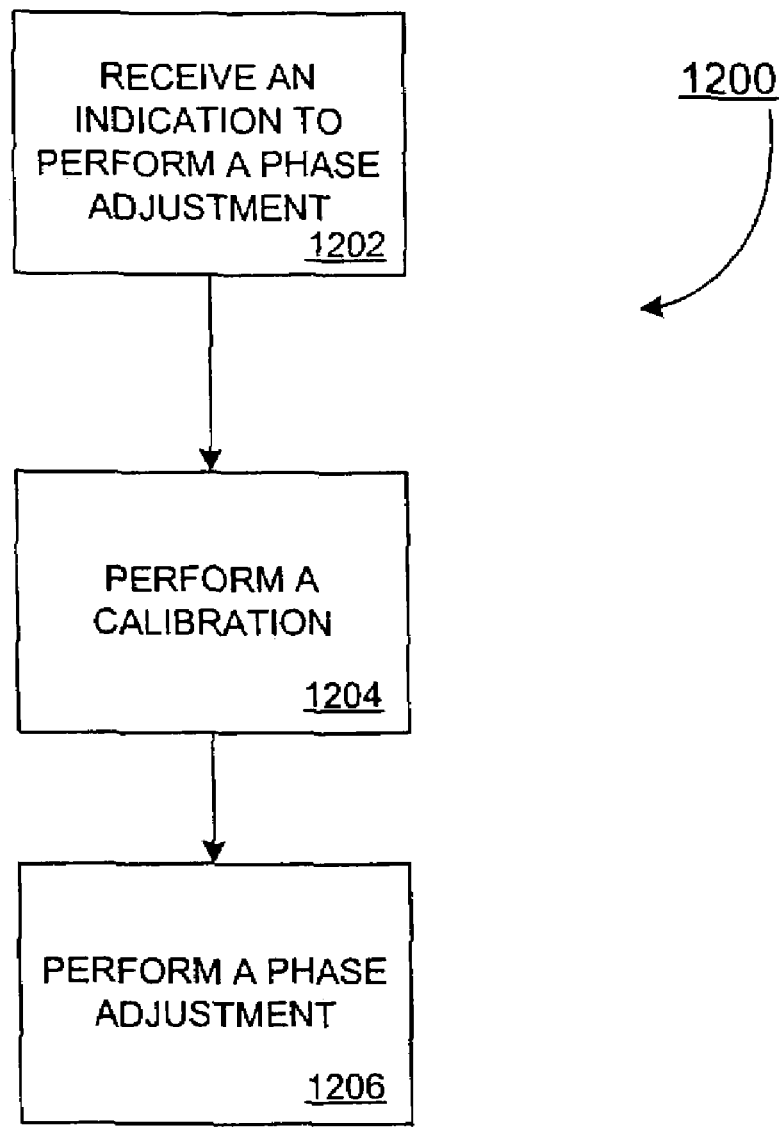
FIG. 12 illustrates a flow diagram for performing a phase adjustment, according to one embodiment of the invention.

The operation of the phase adjuster 502 will now be described. FIG. 12 illustrates a flow diagram for performing a phase adjustment, according to one embodiment of the invention. The operation of flow diagram 1200 will be described with reference to the exemplary systems shown in FIGS. 5–11.

In block 1202, an indication to perform a phase adjustment is received. With reference to the exemplary embodiment of FIG. 5, the phase adjuster 502 receives a phase adjustment indicator 514 indicating that a phase adjustment is to be performed on the clock signal 508. The phase adjustment indictor 514 can be received from a number of sources. For example, in one embodiment, logic within the clock control logic 214 determines that the primary ingress FIFO 210/212 is beyond a threshold on either end of the FIFO to cause a phase adjustment in the traffic card's local clocking source. Accordingly, such logic generates the phase adjustment indicator 514 that is received by the phase adjuster 502.

Figure 13:
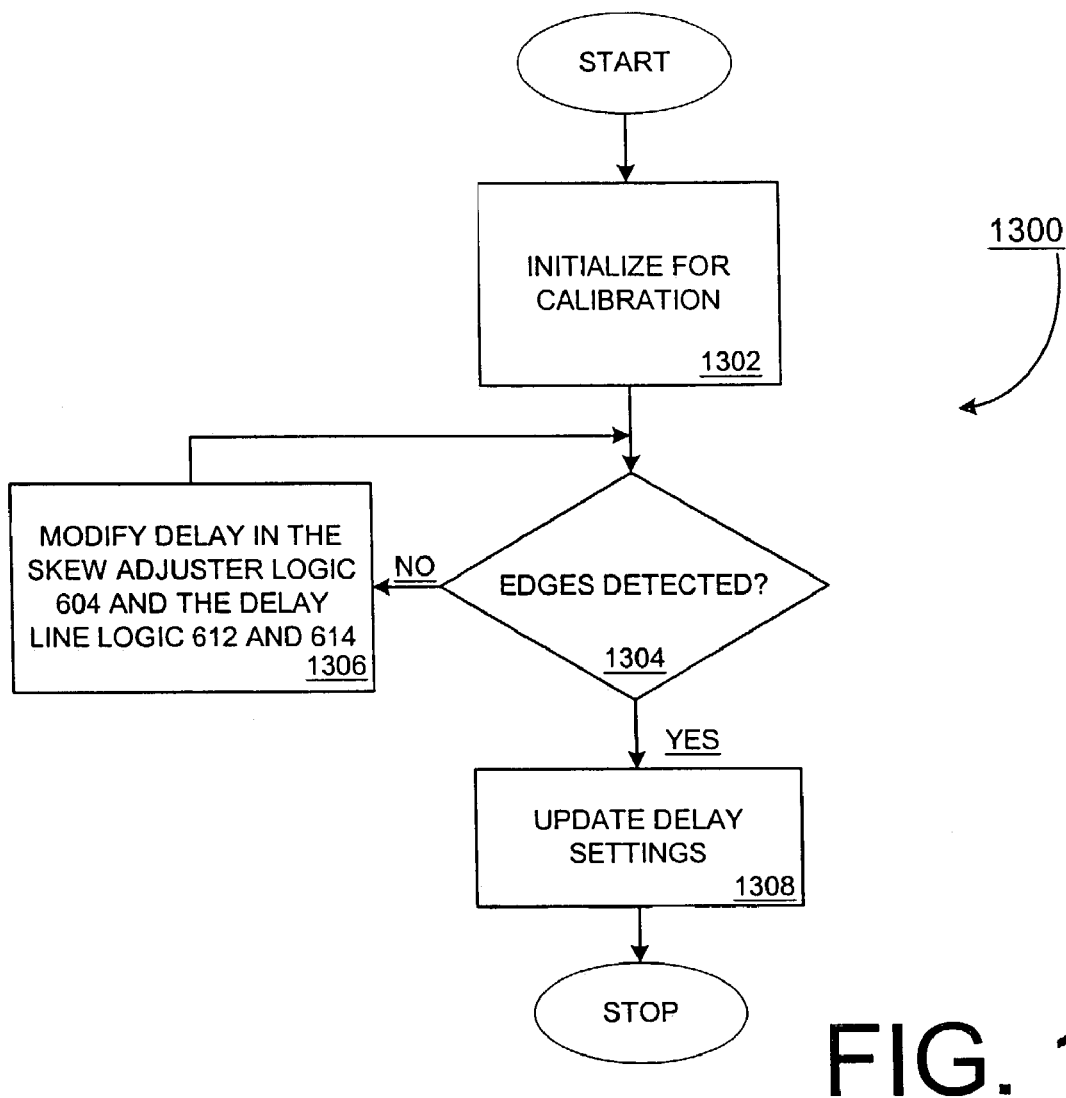
FIG. 13 illustrates a flow diagram for calibrating a phase adjuster for adjusting the phase of a clock signal, according to one embodiment of the invention.

In block 1204, a calibration is performed. With reference to the exemplary embodiment of FIG. 6, the phase adjuster 502 is calibrated. In one embodiment, the calibration mode for the phase adjuster 502 determines the number of delay cells that the clock signal 508 is to traverse within the delay line logic 612 and 614 to cause one cycle of delay in the phase. FIG. 13 (described below) illustrates a flow diagram of the operations of the phase adjuster 502 during calibration, according to one embodiment of the invention.

In block 1206, a phase adjustment is performed. With reference to the exemplary embodiment of FIG. 6, the phase adjuster 502 performs the phase adjustment of the clock signal 508. The phase adjustment is described in more detail below in conjunction with the flow diagram of FIG. 15.

FIG. 13 illustrates a flow diagram for calibrating a phase adjuster for adjusting the phase of a clock signal, according to one embodiment of the invention. The operation of flow diagram 1300 will be described with reference to the exemplary systems shown FIGS. 5–11.

In block 1302, initialization for calibration is performed. With reference to the exemplary embodiment of FIG. 2, logic within the clock control logic 214 causes this initialization. In one embodiment, the clock control logic 214 causes the values stored in the delay register 720 for both delay line logic 612 and 614 to be set to zero to indicate that the delay within the delay line logic 612 and 614 is minimum. In one embodiment, when the delay is minimum, the delay cell 702A is in a loop back mode. In an embodiment, the clock control logic 214 sets the value stored in the delay register 820 in the skew adjuster logic 604 to a midpoint for its operation. Additionally, during calibration, the clock control logic 214 sets the multiplexer 616 in a bypass mode to receive its input from the delay logic 618, while setting the multiplexer 620 to receive its input from the skew adjuster logic 604 (in one embodiment, the skewed output clock 850).

In block 1304, a determination is made on whether the edges are detected. With reference to the exemplary embodiment of FIG. 6, the current rising edge finder logic 606, the falling edge finder logic 608 and the prior rising edge finder logic 610 determine whether the edges of the auxiliary output clocks are located. A more detailed operation for detecting the edges in the auxiliary output clocks will be described below in conjunction with the flow diagram of FIG. 14. Upon determining that the edges of the auxiliary output clocks are detected, the calibration operation shown in FIG. 13 is complete.

In block 1306, upon determining that the edges of the auxiliary output clocks are not detected (on all three detectors simultaneously), the amount of delay in the skew adjuster logic 604 and the delay line logic 612 and 614 is modified. With reference to the exemplary embodiment of FIG. 8, the skew control logic 825 modifies the amount of delay in the skew adjuster logic 604. In an embodiment, the current rising edge finder logic 606 outputs the signals shown in FIG. 10 that indicate whether a rising edge has been located (the positive-move later 1050, the negative-move earlier 1052, the negative found 1054, the positive found 1056, the positive-move earlier 1058 and the negative-move later 1060).

These signals will now be described in more detail. Assuming that a rising edge is to be detected, the positive found 1056, the positive-move earlier 1058 and the positive-move later 1050 are read to determine whether the amount of delay is correct or needs to be decreased or increased, respectively. To better illustrate, if the edge finder logic 606/608/610 outputs a high value for the positive found 1056, a rising edge of the auxiliary output clock has been detected. If the edge finder logic 606/608/610 outputs a high value for the positive-move earlier 1058, the value of the auxiliary output clock is high and the value of the auxiliary output clock that is outputted from the delay line at NAND gate 1026 is high. Accordingly, to locate the rising edge, these references need to be adjusted earlier in time with reference to the auxiliary output clock.

In an embodiment, delay in the skew adjuster logic 604 and the delay line logic 612 and 614 are adjusted by modifying the value stored in the delay register 820 and the delay registers 720, respectively, based on the signals being outputted from the edge finder logic 606/608/610. Additionally, a determination is made on whether the edges are detected again in block 1304.

In block 1308, upon determining that the edges of the auxiliary output clocks are detected, the delay settings are updated. With reference to the exemplary embodiment of FIG. 6, the delay register 820 and the delay registers 720 are now set to the values the correspond to one cycle of the clock based on the finding of the edges therein, thereby completing the calibration of the phase adjuster 502.

Figure 14:
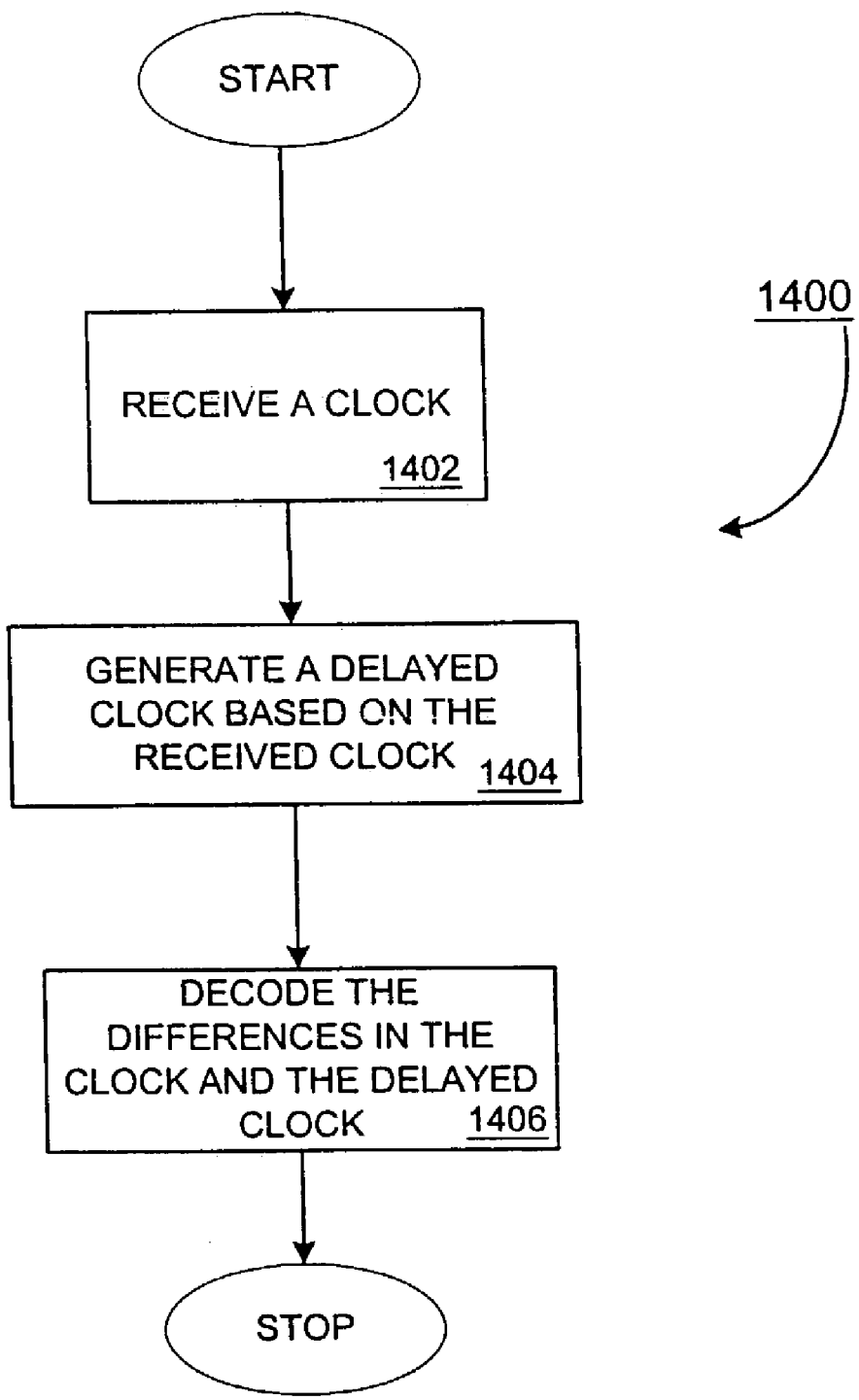
FIG. 14 illustrates a flow diagram for detecting edges in a clock signal, according to one embodiment of the invention.

FIG. 14 illustrates a flow diagram for detecting edges in a clock signal, according to one embodiment of the invention. The operation of flow diagram 1400 will be described with reference to the exemplary systems shown FIGS. 5–11.

In block 1402, a clock is received. With reference to the exemplary embodiment of FIG. 10, the edge finder logic 606/608/610 receives the auxiliary output clock.

In block 1404, a delayed clock is generated based on the received clock. With reference to the exemplary embodiment of FIG. 10, the edge finder logic 606/608/610 generates this delayed clock by passing the auxiliary output clock through the delay line (NAND gates 1006–1026).

In block 1406, the differences in the clock and the delayed clock are decoded. With reference to the exemplary embodiment of FIG. 10, the edge finder logic 606/608/610 decodes these two clocks using the AND gates 1042–1048 to generate the signals 1050–1060, as shown.

Figure 15:
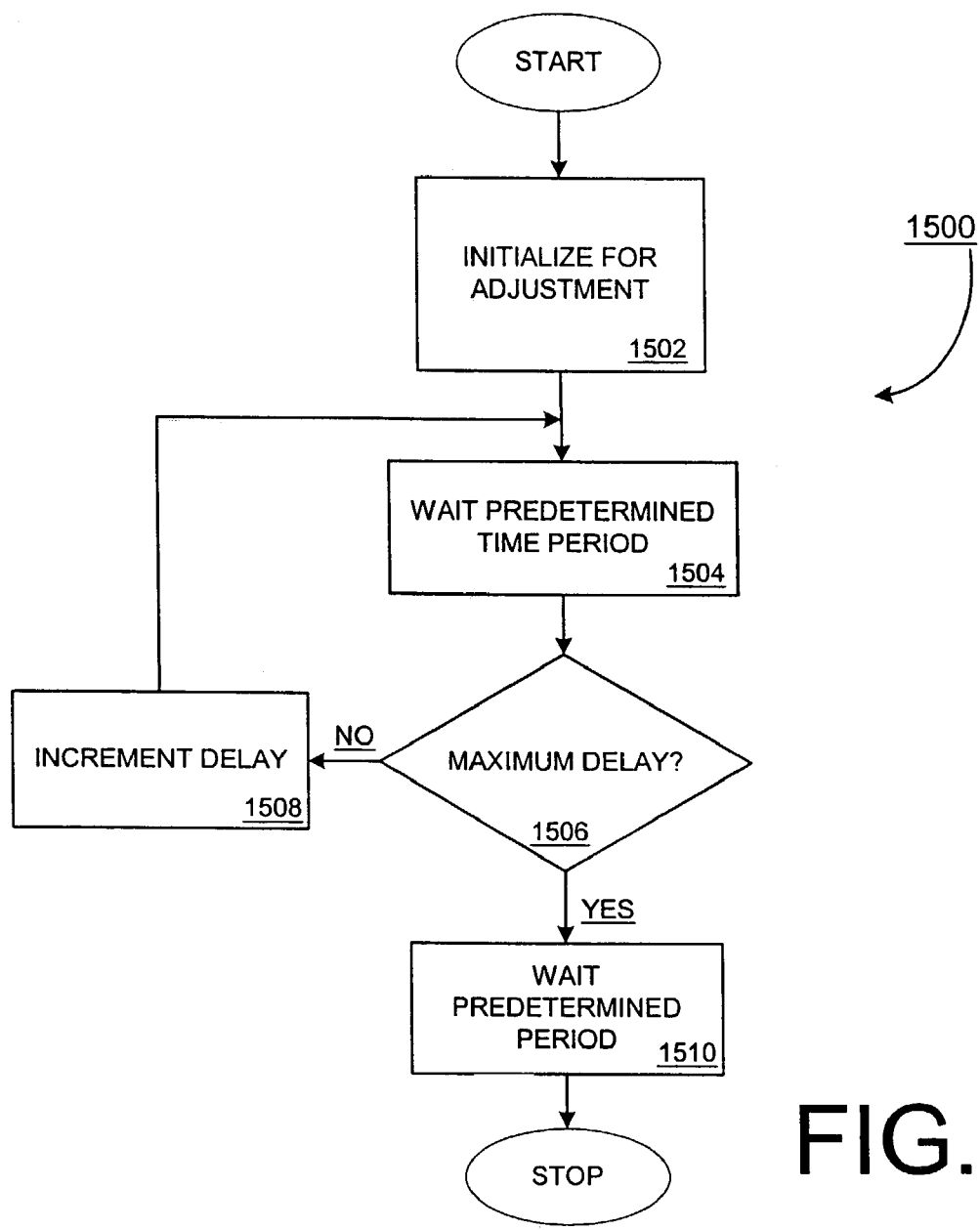
FIG. 15 illustrates a flow diagram for adjusting a phase of a clock signal, according to one embodiment of the invention.

FIG. 15 illustrates a flow diagram for adjusting a phase of a clock signal, according to one embodiment of the invention. The operation of flow diagram 1500 will be described with reference to the exemplary systems shown in FIGS. 5–11.

In block 1502, an initialization for adjustment is performed. With reference to the exemplary embodiment of FIG. 6, in one embodiment, the initialization includes setting the delay within the delay line logic 612 and 614 to a minimum. In one embodiment, the multiplexer 620 is set to output the clock signal 508 to the delay line logic 612. In an embodiment, the multiplexer 616 is set to output the delayed signal coming from the delay line logic 614 as the adjusted clock signal 510.

In block 1504, a wait for a predetermined time period is performed. With reference to the exemplary embodiment of FIG. 6, the phase adjuster 502 waits the predetermined time period as the clock signal 508 passes through the delay cells of the delay line logic 612 and the delay line logic 614. In one embodiment, this delay period is based on an output from the step pulse generator 506.

In block 1506, a determination is made on whether a maximum delay (as determined during calibration) has been reached. With reference to the exemplary embodiment of FIG. 6, the control logic within the delay line logic 612 and 614 determine if the value set within the delay register 720 has been reached.

In block 1508, upon determining that the maximum delay has not been reached, the delay is incremented. With reference to the exemplary embodiment of FIG. 6, the delay line logic 612 and 614 increase the number of delay cells that the clock signal 508 passes therein. The operation continues in block 1504.

In block 1510, upon determining that the maximum delay (as determined during calibration) has been reached, a wait for a predetermined period is performed. Accordingly, the phase adjustment is complete. Accordingly, one cycle of adjustment of the clock signal 508 is performed for the adjustment illustrated in flow diagram 1500.

While FIGS. 12–14 have been described with reference to the retarding of the traffic card's local clocking source, it is understood that the traffic card's local clocking source is similarly advanced, when necessary, by starting at the maximum delay determined during calibration and decrementing to the minimum delay.

The servers as well as the traffic cards, forwarding cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for enabling cross-connect switching in a network element have been described. Although the present invention has been described with reference to specific exemplary embodiments, it will be evident that various modifications and changes may be made to these embodiments without departing from the broader spirit and scope of the invention. For example, while embodiments of the invention are described such that a separate database server is coupled to store data related to subscriber connections. In other embodiments, such data can be stored within the network element 104. Accordingly, the specification and drawings are to be regarded in an illustrative rather than a restrictive sense.

What is claimed is:

1. A method comprising:
   storing data from a primary and a secondary source into a primary memory and a secondary memory based on a primary clock signal and a secondary clock signal;
   framing data being outputted from the primary and the secondary memory;
   adjusting the primary clock signal to adjust an occupancy of the primary memory;
   calibrating a phase adjuster for the primary clock signal; and
   calculating a delay for the primary clock signal to adjust the primary clock signal to accelerate or decelerate the framing of data in the primary memory.

2. The method of claim 1, further comprising:
   generating a signal indicating that a phase adjustment of the primary clock signal is needed.

3. The method of claim 1, wherein the primary memory is a memory that is currently in use for transmitting a frame, and wherein the secondary memory is a memory that is not in use for transmitting a frame.

4. The method of claim 1, further comprising:

adjusting the primary clock signal to adjust the occupancy of an egress memory.

5. A device comprising:

a primary memory;

a secondary memory; and a clock control logic circuit coupled to the primary memory and secondary memory to adjust a primary clock signal to synchronize an occupancy of the primary memory and the secondary memory;

wherein the clock control logic comprises a phase adjuster;

cycle control logic coupled to the phase adjuster; and step pulse generator logic coupled to the cycle control logic, and wherein the phase adjuster comprises a set of delay cells to alter the phase of a primary clock signal.

6. The device of claim 5, further comprising:

a primary deframer coupled to the primary memory; and a secondary deframer coupled to the secondary memory.

7. An apparatus comprising:

a primary control card;

a secondary control card; and a traffic card coupled to the primary control card and secondary control card, the traffic card having a clock control logic circuit coupled to a primary memory and secondary memory to adjust a primary clock signal to synchronize an occupancy of the primary memory and the secondary memory wherein the clock control logic comprises a phase adjuster;

cycle control logic coupled to the phase adjuster; and step pulse generator logic coupled to the cycle control logic.

8. The apparatus of claim 7, wherein the primary control card is in use and the secondary control card is a back up card.

9. The device of claim 7, further comprising:

a second traffic card coupled to the primary control card and the secondary control card.

10. An apparatus comprising:

means for storing data from a primary and a secondary source into a primary memory and a secondary memory based on a primary clock signal and a secondary clock signal;

means for framing data being outputted from the primary and the secondary memory;

means for adjusting the primary clock signal to adjust an occupancy of the primary memory;

means for calibrating a phase adjuster for the primary clock signal; and means for calculating a delay for the primary clock signal to adjust the primary clock signal to accelerate or decelerate the framing of data in the primary memory.

11. The apparatus of claim 10, further comprising:

means for generating a signal indicating that a phase adjustment of the primary clock signal is needed.

12. The method of 10, further comprising:

means for adjusting the primary clock signal to adjust an occupancy of an egress memory.

13. A machine readable medium, having instruction stored therein, which when executed cause a computer to perform a set of operations comprising:

storing data from a primary and a secondary source into a primary memory and a secondary memory based on a primary clock signal and a secondary clock signal;

framing data being outputted from the primary and the secondary memory;

adjusting the primary clock signal to adjust an occupancy of the primary memory;

calibrating a phase adjuster for the primary clock signal; and calculating a delay for the primary clock signal to adjust the primary clock signal to accelerate or decelerate the framing of data in the primary memory.

14. The machine readable medium of claim 13, having further instructions stored therein, which when executed cause a computer to perform a set of operations comprising:

generating a signal indicating that a phase adjustment of the primary clock signal is needed.

15. The machine readable medium of claim 13, wherein the primary memory is a memory that is currently in use for transmitting a frame, and wherein the secondary memory is a memory that is not in use for transmitting a frame.

16. An apparatus comprising:

a traffic card including, a first and second ingress FIFO to be coupled to respectively receive both data and a clock signal from a first and second control card;

a first and second deframer respectively coupled to said first and second ingress FIFOs;

an aligner coupled to said first and second FIFO to keep the occupancy of data therein in sync based upon detected differences in alignment of data being received by the first and second deframers;

a clock control logic to receive the clock signal from each of said first and second control cards, to exchange with a PLL a first clock signal for a PLL adjusted clock signal, and to provide said PLL adjusted clock signal to said aligner, said first ingress FIFO, and said second ingress FIFO, said clock control logic including, a phase adjuster to provide said first clock signal based on a currently selected one of the clock signals from said first and second control cards.

* * * * *